US012755732B2

(12) United States Patent
Malik et al.

(10) Patent No.: US 12,755,732 B2
(45) Date of Patent: Oct. 6, 2026

(54) MODEL SUBSTITUTION FOR EFFICIENT DEVELOPMENT OF A SOLUTION

(71) Applicant: Groq, Inc., Mountain View, CA (US)

(72) Inventors: Gurshaant Singh Malik, Ontario (CA); Tim Sears, Palo Alto, CA (US)

(73) Assignee: Groq LLC, San Jose, CA (US)

( * ) Notice: Subject to any disclaimer, the term of this patent is extended or adjusted under 35 U.S.C. 154(b) by 169 days.

(21) Appl. No.: 18/420,097

(22) Filed: Jan. 23, 2024

(65) Prior Publication Data

US 2024/0249716 A1 Jul. 25, 2024

Related U.S. Application Data

(60) Provisional application No. 63/481,224, filed on Jan. 24, 2023.

(51) Int. Cl.
*G10L 15/16* (2006.01)
*G10L 15/197* (2013.01)

(52) U.S. Cl.
CPC ............ *G10L 15/16* (2013.01); *G10L 15/197* (2013.01)

(58) Field of Classification Search
CPC .............................. G10L 15/16; G10L 15/197
See application file for complete search history.

(56) References Cited

FOREIGN PATENT DOCUMENTS

WO WO-2022121150 A1 * 6/2022 ............ G10L 15/26

OTHER PUBLICATIONS

Perez Gonzalez de Martos, Deep neural networks for automatic speech-to-speech translation of open educational resources, Thesis, Universitat Politecnica de Valencia, 2022 (Year: 2022).*
Amodei et al., Deep Speech 2: End-to-end Speech Recognition in English and Mandarin, International Conference on Machine Learning, PMLR, 2016 (Year: 2016).*
Andersson, Deep Learning Applied to System Identification: A Probabilistic Approach, Diss. Uppsala University, 2019 (Year: 2019).*
Bello et al., Attention Augmented Convolutional Networks, Proceedings of the IEEE/CVF International Conference on Computer Vision, 2019 (Year: 2019).*
Koutsoukos et al., Tensors: An abstraction for general data processing, Proceedings of the VLDB Endowment 14.10, 2021 (Year: 2021).*
Munoz-Martinez et al., STONNE: A Detailed Architectural Simulator for Flexible Neural Network Accelerators, arXiv:2006.07137, 2020 (Year: 2020).*
Huang et al., An Efficient Parallel Processor for Dense Tensor Computation, IEEE Transactions on Very Large Scale Integration (VLSI) Systems 29.7, 2021 (Year: 2021).*

(Continued)

*Primary Examiner* — Bhavesh M Mehta
*Assistant Examiner* — Eunice Lee
(74) *Attorney, Agent, or Firm* — Dority & Manning, P.A.

(57) ABSTRACT

A neural network architecture for natural language processing is provided. The neural network architecture comprises: a speech-to-text encoder configured to encode an input speech signal; a Bifrost speech recognizable engine configured for processing the encoded speech signal to generate a speech recognized signal corresponding to the input speech signal; and a decoder configured to decode the speech recognized signal and to generate the output sequence.

20 Claims, 17 Drawing Sheets
(9 of 17 Drawing Sheet(s) Filed in Color)

(56) References Cited

OTHER PUBLICATIONS

Hong, et al., Dfx: A Low-Latency Multi-FPGA Appliance for Accelerating Transformer-based Text Generation, 2022 55th IEEE/ACM International Symposium on Microarchitecture (MICRO) IEEE, 2022 (Year: 2022).*

Raval et al., Improving deep learning based automatic speech recognition for Gujarati, Transactions on Asian and Low-Resource Language Information Processing 21.3, 2021 (Year: 2021).*

* cited by examiner

The Demo with Real Audio Files

In [ ] :

```
from demo_helpers.models import load_pretrained
from groqflow import groqit
import torch
from torchaudio.transforms import MFCC

import numpy as np
import os

from pydub import AudioSegment, effects
import Ipython.display as ipd
import time
from prettytable import PrettyTable
import torch

import matplotlib.pyplot as plt


os.environ["GROQFLOW_SKIP_SDK_CHECK"]="True"

# set seed for consistency
torch.manual_seed(42)
import noisereduce as nr
```

FIG. 5

File Edit View Insert Cell Kernel Widgets Help Trusted | Python 3 (ipykernel)

```
import time
from prettytable import PrettyTable
import torch

import matplotlib.pyplot as plt


os.environ["GROQFLOW_SKIP_SDK_CHECK"]="True"

# set seed for consistency
torch.manual_seed(42)
import noisereduce as nr
```

We now load our bifrost model. This model has been trained on LibriSpeech-960h dataset. The model consumes around 22M parameters.

The model outputs are a probability matrix, distributed over time and phoneme labels. We use CTC decoding to convert this temporal probability matrix into actual text. Hence, we also load up our CTC decoder model.

In [ ]:

```
# load pre-trained torch model
Torch_model = load_pretrained("bifrost")
Torch_model.eval()

# load 3-gram language model shallow fused with ctc decoder
Decoder = load_pretrained("ctc_lm_decoder")

# dummy inputs to generate groq model
Dummy_input = torch.randn([1, 256, 512])

Build_name = "bifrost"
Groq_model = groqit(
        torch_model,
        {"x": dummy_input},
        build_name=build_name,
        num_chips=2,
        compiler_flags=["--ia-mode-all"]
)
```

FIG. 6

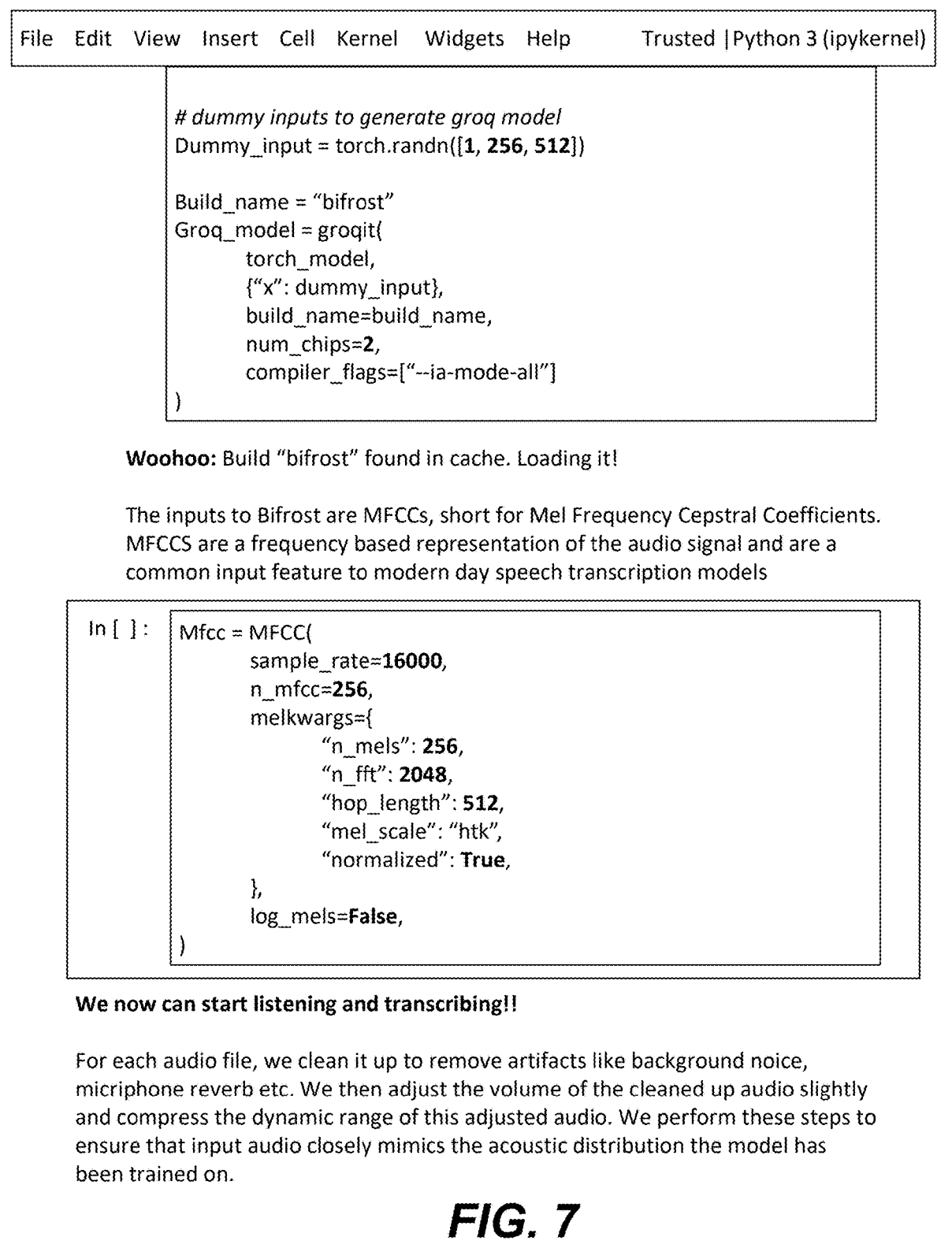

File Edit View Insert Cell Kernel Widgets Help Trusted | Python 3 (ipykernel)

```
# dummy inputs to generate groq model
Dummy_input = torch.randn([1, 256, 512])

Build_name = "bifrost"
Groq_model = groqit(
        torch_model,
        {"x": dummy_input},
        build_name=build_name,
        num_chips=2,
        compiler_flags=["--ia-mode-all"]
)
```

Woohoo: Build "bifrost" found in cache. Loading it!

The inputs to Bifrost are MFCCs, short for Mel Frequency Cepstral Coefficients. MFCCS are a frequency based representation of the audio signal and are a common input feature to modern day speech transcription models In [ ]:

```
Mfcc = MFCC(
        sample_rate=16000,
        n_mfcc=256,
        melkwargs={
                "n_mels": 256,
                "n_fft": 2048,
                "hop_length": 512,
                "mel_scale": "htk",
                "normalized": True,
        },
        log_mels=False,
)
```

We now can start listening and transcribing!!

For each audio file, we clean it up to remove artifacts like background noice, micriphone reverb etc. We then adjust the volume of the cleaned up audio slightly and compress the dynamic range of this adjusted audio. We perform these steps to ensure that input audio closely mimics the acoustic distribution the model has been trained on.

*FIG. 7*

```
In [ ]: test_files={"../audio_4.flac":0,"../audio_6.flac":0,"../aud_1.flac":0,"../aud_2.wav":10}

For key in test_files.keys():
        audio = AudioSegment.from_file(key)

        ipd.display(ipd.Audio(key))

        #clean up audio
        audio_data = np.array(audio.get_array_of_samples(), dtype=np.int16)
        audio_data = nr.reduce_noise(y=audio_data, sr=16000)
        cleaned_audio = AudioSegment(
            audio_data.tobytes(), frame_rate=16000, sample_width=2, channels=1
        )

        #adjust volume of cleaned audio
        Inc = test_files[key]
        cleaned_audio += inc

        #compress dynamic range
        cleaned_cdr_audio = effects.compess_dynamic_range(cleaned_audio)

        #convert to torch tensor
        cleaned_cdr_aud_dat = np.array(cleaned_cdr_audio.get_array_of_samples(),
dtype=np.float32)
        cleaned_cdr_aud_dat = cleaned_cdr_aud_dat / sum(cleaned_cdr_aud_dat)
        audio_tensor = torch.from_numpy(cleaned_cdr_aud_dat)

        #extract mfccs
        mfcc_data = mfcc(audio_tensor).unsqueeze(0)

        #pad to 512
        if mfcc_data.shape[-1] <= 512:
                mfcc_data = torch.cat(
                        [mfcc_data,
                        torch.zeros((mfcc_data.shape[0], mfcc_data.shape[1] –
                mfcc_data.shape[-1], dtype=, dim=-1)

        #transcribe using groq
        groq_logits = groq_mode.run_abunch([{"x": mfcc_data}]).squeeze(0)
        print(decoder.decode(groq_logits.numpy(), beam_width=500))
```

FIG. 8

File Edit View Insert Cell Kernel Widgets Help Trusted | Python 3 (ipykernel)

```
)
plt.plot(
        [x * audio_length_512 // 60 for x in gpu_performance.keys()],
        [1000 / y for y in gpu_performance.values()],
        label="a100 gpu",
        marker="o",
)
plt.xlabel("Minutes of Streamed Audio (16 s chunks)")
plt.ylabel("Sustained Throughput (Sampled per second)")
plt.legend()
plt.title("Throughput: Higher and Increasing is better")
plt.show()
```

Each Audio Sample is 16s long

| Device | E2E Latency per Sample | Latency for 1 min. of Audio | Throughput |
|---|---|---|---|
| CPU | 146.0 ms | 547.0 ms | 6.84 Audio samples/s |
| A100 | 35.0 ms | 131.0 ms | 28.57 Audio samples/s |
| Groq | 5.0 ms | 18.0 ms | 200.0 Audio samples/s |

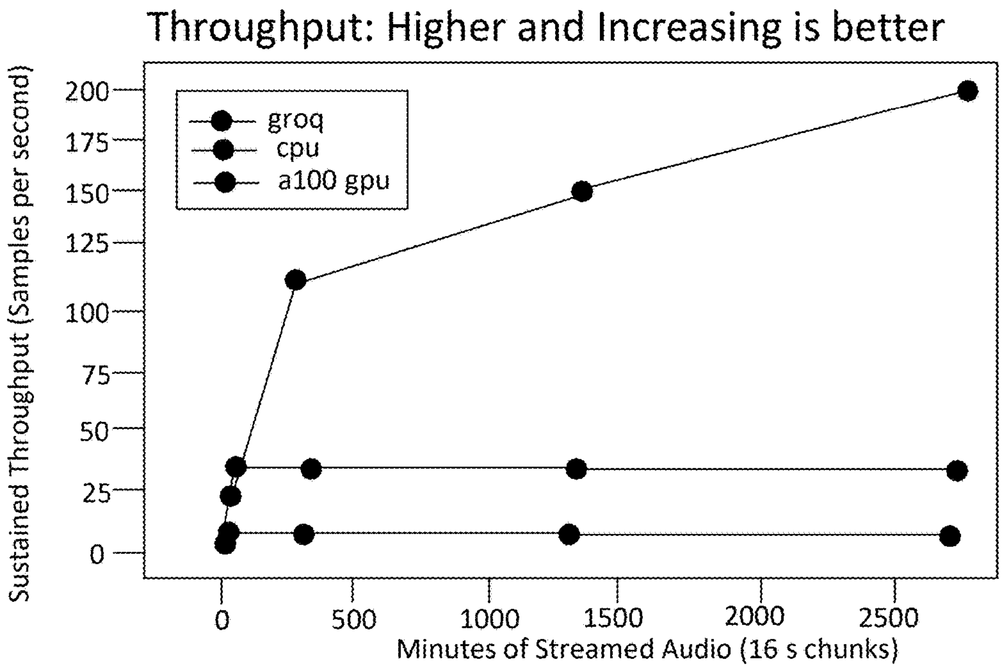

*FIG. 9*

```
from groqflow import groqit
from transformers import Speech2TextProcessor, Speech2TextForConditionalGeneration
from model import MultiStreamModel, ModifiedS2T
from tokenizer import PhonemeTokenizer
import torch
import torchaudio

import numpy as np
from ipywebrtc import AudioRecorder, CameraStream
import os

global_config = {
    # data related parameters
    "target_batch_size": 64,
    "batch_size_single_gpu": 16,
    "use_specaug": False,
    # model related parameters
    "precision": 16,
    "dropout": 0.1,
    "num_layers": 4,  # 9,
    "num_out_channels": 252,
    "dilation_per_stream_index": [2, 4, 6, 8, 10],
    "num_conv1d_blocks": 9,
    "num_attention_heads": 4,
    "freeze_encoder": False,
    "freeze_decoder": False,
    "freeze_lm_head": False,
    # optimizer related parameters
    "learning_rate": 1e-5,
    "scheduler": "cycle",
    "epochs": 500,
    "overfit": False,
}
from pyctcdecode import build_ctcdecoder
```

FIG. 10

```
# get feature extractor
processor = Speech2TextProcessor.from_pretrained(
    "facebook/s2t-medium-librispeech-asr"
)

feature_extractor = processor.feature_extractor

# get tokenizer
tokenizer = PhonemeTokenizer()

# define multi_stream model
num_in_channels = 512  # ms_data.feature_extractor.feature_size
num_classes = 512
multi_stream_model = MultiStreamModel(
    num_layers=global_config["num_layers"],
    num_in_channels=num_in_channels,
    num_out_channels=global_config["num_out_channels"],  # 256,
    kernel_size=2,
    dilation_per_stream_index=global_config[
        "dilation_per_stream_index"
    ],
    dropout=global_config["dropout"],

    num_conv1d_blocks=global_config["num_conv1d_blocks"],
    num_attention_heads=global_config["num_attention_heads"],
    classifier_dropout=global_config["dropout"],
    num_classes=num_classes,
)

# create encoder model
s2t_model = Speech2TextForConditionalGeneration.from_pretrained(
    "facebook/s2t-medium-librispeech-asr"
)
```

FIG. 11A

```
s2t_encoder = s2t_model.get_encoder()
# create lm model head
s2t_lm = s2t_model.lm_head

# create overall model
model = ModifiedS2T(
    s2t_encoder=s2t_encoder,
    multi_stream_model=multi_stream_model,
    s2t_lm=s2t_lm,
    num_classes=len(tokenizer.get_vocab()) + 1,
    blank_label_id=tokenizer.pad_token_id,
    config=global_config,
    ctc_decoder=None,
)

# load weights on model
model.load_state_dict(
    torch.load(
        "model_state.ckpt"
    , map_location=torch.device('cpu'))["state_dict"],
    strict=True,
)
model.eval()

decoder = build_ctcdecoder(tokenizer.get_vocab(), "lowercase_4-gram.arpa")
# decoder = build_ctcdecoder(tokenizer.get_vocab())
```

FIG. 11B

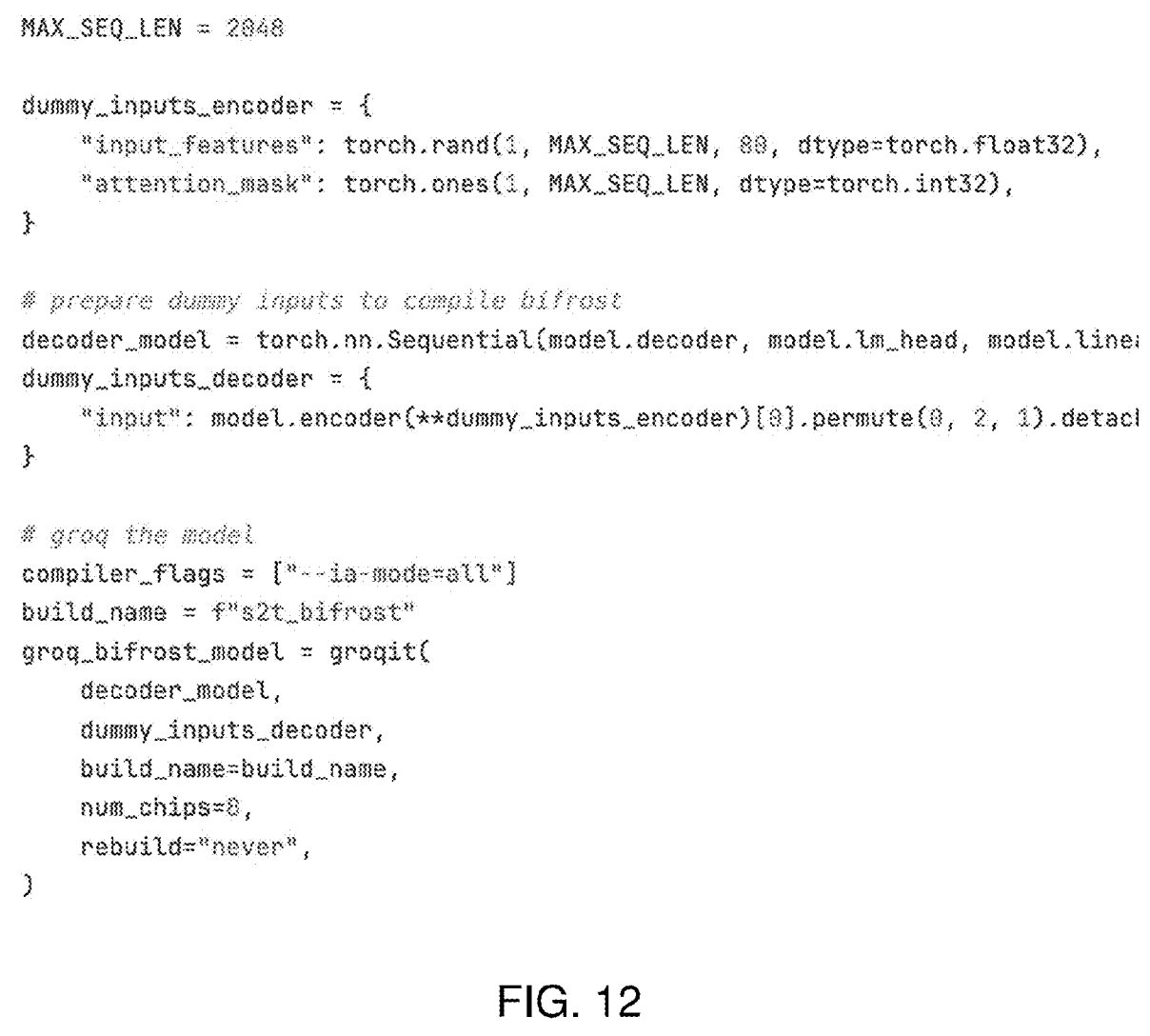

```
MAX_SEQ_LEN = 2048

dummy_inputs_encoder = {
    "input_features": torch.rand(1, MAX_SEQ_LEN, 80, dtype=torch.float32),
    "attention_mask": torch.ones(1, MAX_SEQ_LEN, dtype=torch.int32),
}

# prepare dummy inputs to compile bifrost
decoder_model = torch.nn.Sequential(model.decoder, model.lm_head, model.line
dummy_inputs_decoder = {
    "input": model.encoder(**dummy_inputs_encoder)[0].permute(0, 2, 1).detac
}

# groq the model
compiler_flags = ["--ia-mode=all"]
build_name = f"s2t_bifrost"
groq_bifrost_model = groqit(
    decoder_model,
    dummy_inputs_decoder,
    build_name=build_name,
    num_chips=8,
    rebuild="never",
)
```

FIG. 12

```
test_files = {
    "audio_files/test_s2t_4.wav": {},
    "audio_files/test_s2t_3.wav": {},
#     "audio_files/test_s2t_2.wav": {},
    "audio_files/test_s2t.wav": {},
    "audio_files/audio_4.flac": {},
    "audio_files/audio_6.flac": {},
    "audio_files/audio_1.flac": {},
#     "audio_files/audio_2.wav": {},
}

active_files = {}
max_seq_len = 2048

# run s2t encoder
for key in test_files.keys():
    audio, sample_rate = torchaudio.load(key)

    inputs = feature_extractor(audio[0], sampling_rate=16000, return_tensors="pt")

    mfcc_data = inputs.input_features[0].unsqueeze(0)
    attention_data = inputs.attention_mask[0].unsqueeze(0)

    if mfcc_data.shape[1] <= max_seq_len:
        active_files[key] = {}
        mfcc_data = torch.concat([mfcc_data, torch.zeros(1, max_seq_len-mfcc_data.shape[1], mfcc_data.sh
        attention_data = torch.concat([attention_data, torch.zeros(1, max_seq_len-mfcc_data.shape[1], dt
        active_files[key]["encoder_outputs_cpu"] = torch.tensor(np.ascontiguousarray(model.encoder(mfcc_
```

FIG. 13

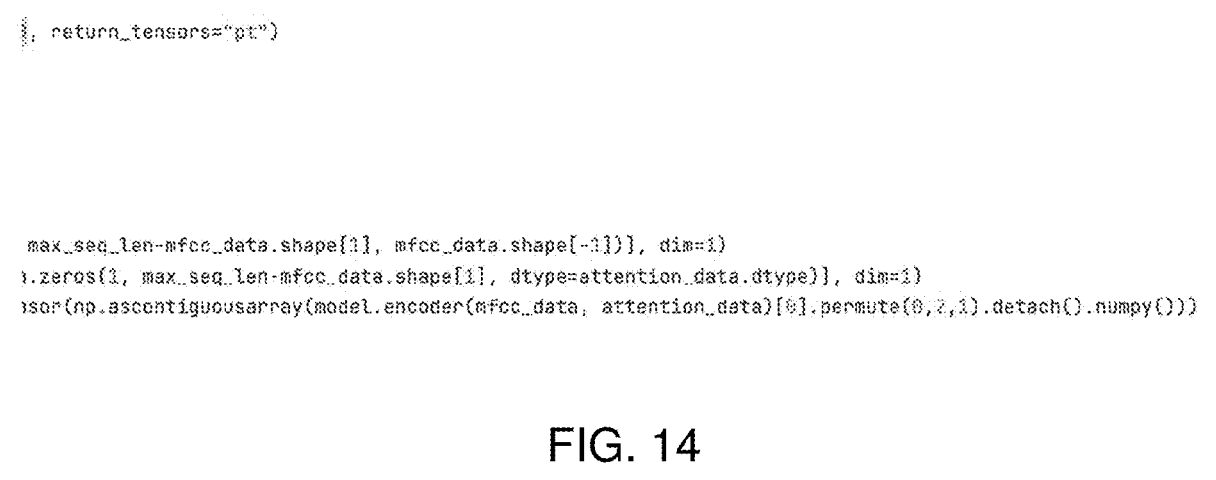

```
, return_tensors="pt")
```

```
max_seq_len-mfcc_data.shape[1], mfcc_data.shape[-1])], dim=1)
.zeros(1, max_seq_len-mfcc_data.shape[1], dtype=attention_data.dtype)], dim=1)
isor(np.ascontiguousarray(model.encoder(mfcc_data, attention_data)[0].permute(0,2,1).detach().numpy()))
```

FIG. 14

```
# run bifrost on cpu
for key in active_files.keys():
    active_files[key]["bifrost_outputs_cpu"] = decoder_model(active_files[key]["encoder_outputs_cpu"])

# decode text on cpu
for key in active_files.keys():
    ipd.display(ipd.Audio(key))

    active_files[key]["text"] = decoder.decode(active_files[key]["bifrost_outputs_cpu"].squeeze(0).deta
    print(active_files[key]["text"])
```

```
# import os

os.environ['PYTHONPATH']='/opt/groq/runtime/site-packages/'
# run bifrost on groq
bifrost_outputs_groq = groq_bifrost_model.run_abunch(
    [{"input": active_files[key]["encoder_outputs_cpu"]} for key in active_files.keys()]
)
```

```
for key, bifrost_output_groq in zip(active_files.keys(), bifrost_outputs_groq):
    active_files[key]["bifrost_outputs_groq"] = bifrost_output_groq

# decode text on groq
for key in active_files.keys():
    active_files[key]["text"] = decoder.decode(active_files[key]["bifrost_outputs_groq"].squeeze(0).det
    print(active_files[key]["text"])
```

FIG. 15A

```
:
.outputs_cpu"] = decoder_model(active_files[key]["encoder_outputs_cpu"])


:
)

= decoder.decode(active_files[key]["bifrost_outputs_cpu"].squeeze(0).detach().numpy(), beam_width =500)
ext"])
```

```
# import os

os.environ['PYTHONPATH']='/opt/groq/runtime/site-packages/'
# run bifrost on groq
bifrost_outputs_groq = groq_bifrost_model.run_abunch(
    [{"input": active_files[key]["encoder_outputs_cpu"]} for key in active_files.keys()]
)
```

```
zip(active_files.keys(), bifrost_outputs_groq):
outputs_groq"] = bifrost_output_groq



decoder.decode(active_files[key]["bifrost_outputs_groq"].squeeze(0).detach().numpy(), beam_width =500)
xt"])
```

FIG. 15B

MODEL SUBSTITUTION FOR EFFICIENT DEVELOPMENT OF A SOLUTION

CROSS-REFERENCE TO RELATED APPLICATIONS

This application claims the benefit of priority to U.S. Provisional Application No. 63/481,224, filed Jan. 24, 2023, and entitled "MODEL SUBSTITUTION FOR EFFICIENT DEVELOPMENT OF A SOLUTION," the entirety of which is expressly incorporated herein by reference.

COPYRIGHT NOTICE

This patent document can be exactly reproduced as it appears in the files of the United States Patent and Trademark Office, but the assignee(s) otherwise reserves all rights in any subsets of included original works of authorship in this document protected by 35 USC 102(a) of the U.S. copyright law.

SPECIFICATION—DISCLAIMERS

In the following Background, Summary, and Detailed Description, paragraph headings are signifiers that do not limit the scope of an embodiment of a claimed technology (ECIN). The citation or identification of any publication signifies neither relevance nor use as prior art. A paragraph for which the font is all italicized signifies text that exists in one or more patent specifications filed by the assignee(s). A writing enclosed in double quotes (" ") signifies an exact copy of a writing that has been expressed as a work of authorship. Signifiers, such as a word or a phrase enclosed in single quotes (' '), signify a term that as of yet has not been defined and that has no meaning to be evaluated for, or has no meaning in that specific use (for example, when the quoted term 'module' is first used) until defined.

Technical Field

This disclosure has general significance in the field of artificial intelligence, in particular, significance for the following topics: sequence-to-sequence (Seq2Seq) AI architectural models, natural language processing tasks such as machine translation, text summarization, and question answering. This information is limited to use in the searching of the prior art.

Background

A sequence-to-sequence (Seq2Seq) AI model is an architectural term to define a certain type of neural network architecture that is commonly used for natural language processing tasks such as machine translation, text summarization, and question answering.

It consists of two main components: an encoder, which processes the input sequence, and a decoder, which generates the output sequence. The encoder and decoder are typically implemented using recurrent neural networks (RNNs) or transformer networks.

The encoder takes in the input sequence and produces a fixed-length context vector, which is used by the decoder to generate the output sequence.

Seq2Seq models are trained by providing pairs of input and output sequences and minimizing the difference between the model's predicted output and the true output.

Sequens has a number of tokens. A token is a part of the sequence (e.g., letter, word, part of the word.)

A Seq2Seq architecture or model refers to a class of problems that makes a prediction based on an input sequence of data. One example of a Seq2Seq model is speech transcription where a word processor creates a printed document based on spoken words.

However, the Seq2Seq models impose some temporal dependencies which means that while implementing such models on hardware processing devices (such as a GPU, CPU or TPU) there are periods where data must be returned to a host processor to complete the model's processing steps.

Unfortunately, Seq2Seq models may not run efficiently on various compute or accelerator hardware platforms. To illustrate, a hardware processing device runs the encoder in a step-by-step fashion where each word in the sequence is processed to infer what the next word should be. In such processing devices, the output at one time step becomes the input to the next time step.

This relational dependency creates a bottleneck because architecture basically works in a step-by-step fashion. In many hardware accelerators, the generated output for each step is sent from the hardware accelerator to a host CPU and then fed back again into the hardware accelerator to perform another inference. That output is then sent back to the host for post processing. A simple intuitive illustration of this process is a car traveling along on a highway for one mile at which time it takes an off-ramp and then, after a requisite stop at the end of the off-ramp, it takes the on-ramp before driving another mile at which time it takes the next off-ramp and on-ramp to continue its drive along the highway. Obviously, this is not an efficient approach to arriving at the intended destination in a timely fashion. Neither is it an efficient approach to performing the inferences and generating an appropriate response.

SUMMARY

This Summary, together with any Claims, is a brief set of signifiers for at least one ECIN (which can be a discovery, see 35 USC 100(a); and see 35 USC 100(j)), for use in commerce for which the Specification and Drawings satisfy 35 USC 112.

Instead of using a Seq2Seq model architecture, a preferred embodiment of the claimed technology (ECIN) substitutes a different type of neural network architecture that makes the model efficiently run on a variety of hardware platforms.

More specifically, in one ECIN, the Seq2Seq model is replaced with an equivalent model that does not sacrifice the accuracy of the neural network but eliminates the need to process in a step-by-step fashion.

In one ECIN the equivalent model comprises a neural network architecture for natural language processing. The neural network architecture comprises: a speech-to-text encoder configured to encode an input speech signal; a Bifrost speech recognizable engine configured for processing the encoded speech signal to generate a speech recognized signal corresponding to the input speech signal; and a decoder configured to decode the speech recognized signal and to generate the output sequence.

This Summary does not completely signify any ECIN. While this Summary can signify at least one essential element of an ECIN enabled by the Specification and Figures, the Summary does not signify any limitation in the scope of any ECIN.

BRIEF DESCRIPTION OF THE DRAWINGS

The patent or application file contains at least one drawing executed in color. Copies of this patent or patent application publication with color drawing(s) will be provided by the Office upon request and payment of the necessary fec.

The following Detailed Description, Figures, and Claims signify the uses of progress enabled by one or more ECINs. All the Figures are used only to provide knowledge and understanding and do not limit the scope of any ECIN. Such Figures are not necessarily drawn to scale. The Figures can have the same, or similar, reference signifiers in the form of labels (such as alphanumeric symbols, e.g., reference numerals), and can signify a similar or equivalent function or use. Further, reference signifiers of the same type can be distinguished by appending to the reference label a dash and a second label that distinguishes among the similar signifiers. If only the first label is used in the Specification, its use applies to any similar component having the same label irrespective of any other reference labels. A brief list of the Figures is below.

In the Figures, reference signs can be omitted as is consistent with accepted engineering practice; however, a skilled person will understand that the illustrated components are understood in the context of the Figures as a whole, of the accompanying writings about such Figures, and of the embodiments of the claimed technologies.

Figure 1:
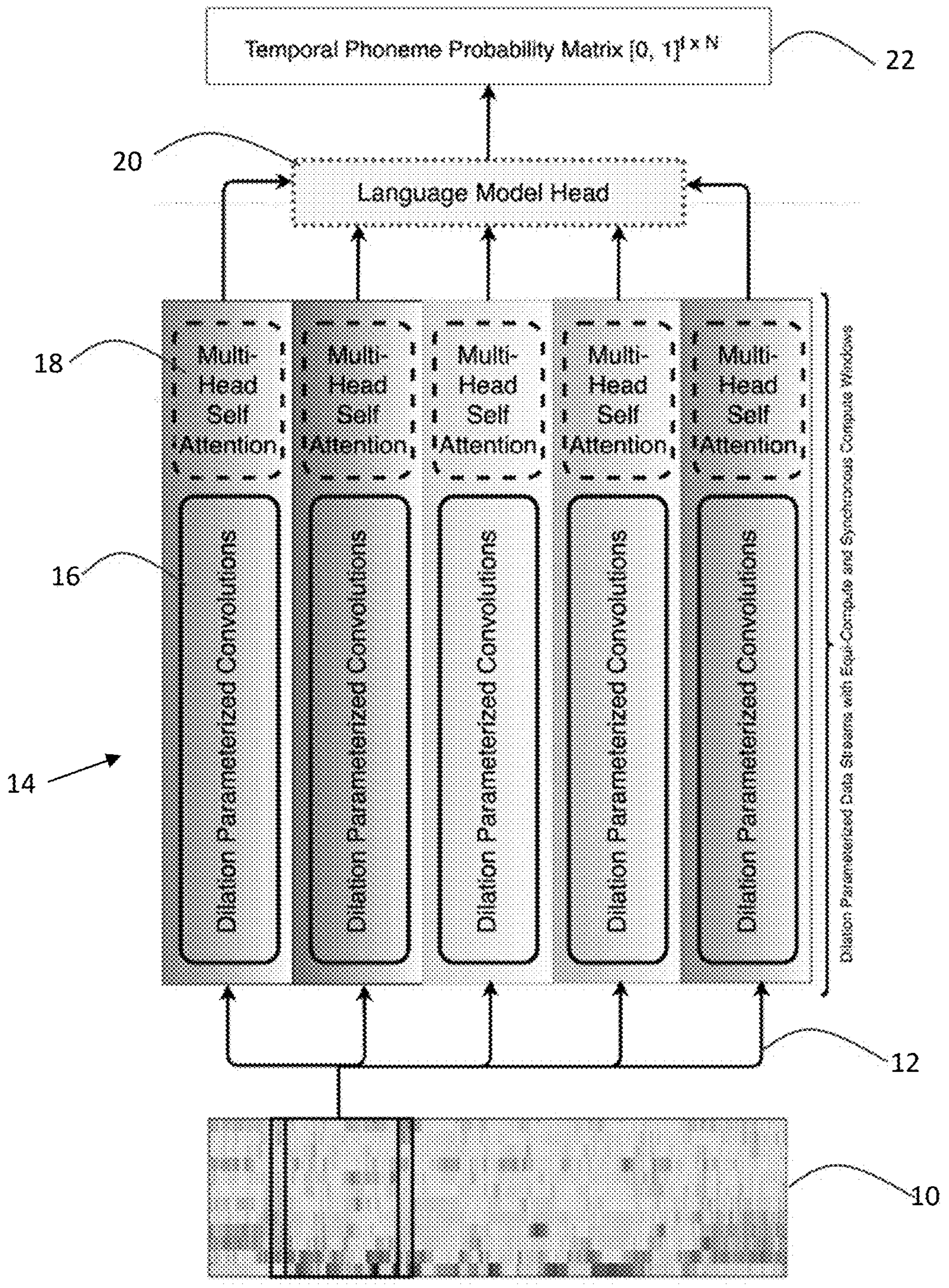

FIG. 1 illustrates an equivalent neural network model of the speech-to-text encoder that replaces a prior art Seq2Seg model in accordance with some embodiments of the present technology.

Figure 2:
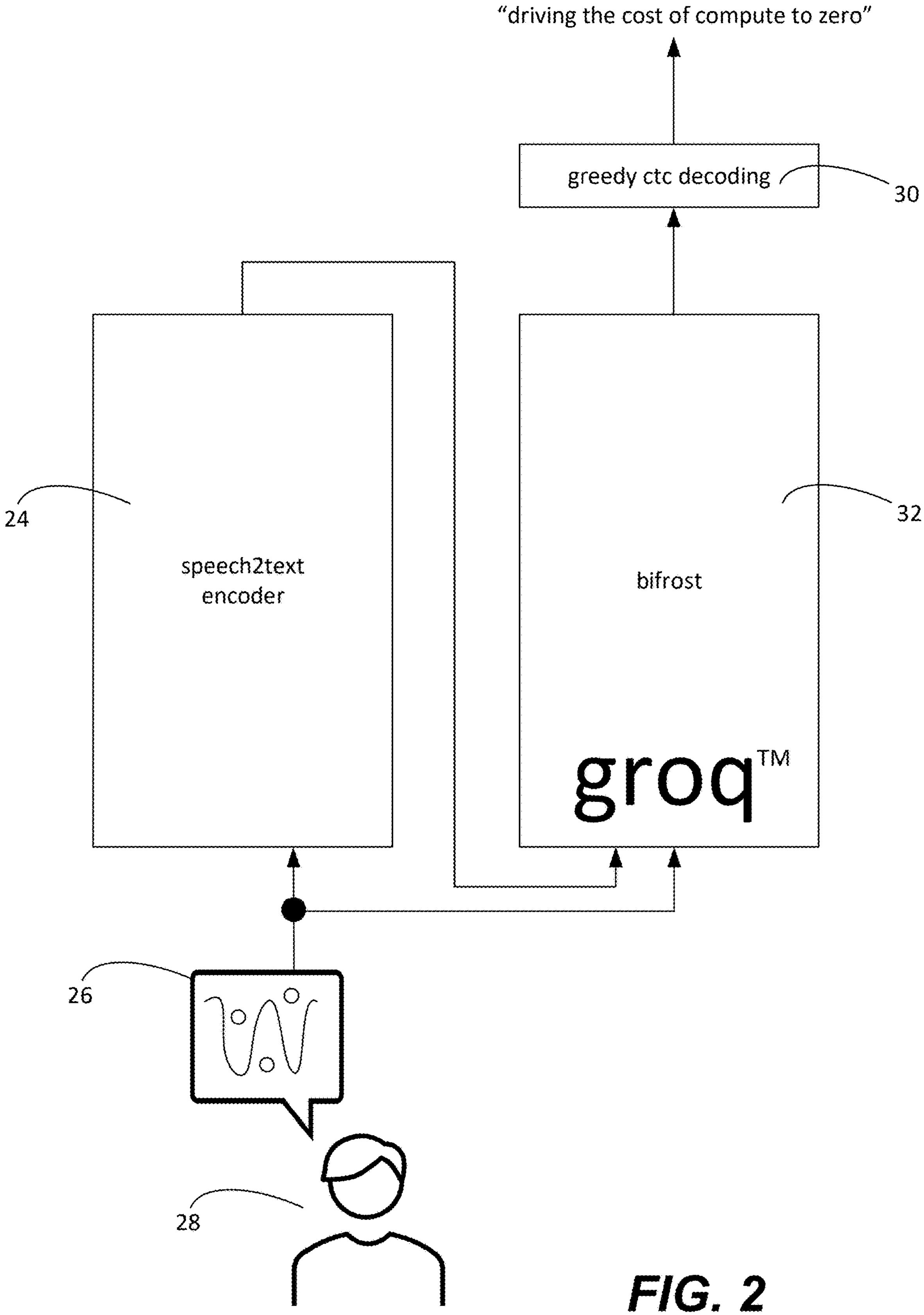

FIG. 2 illustrates a neural network model including the speech-to-text encoder, the Groq Bifrost speech recognizable engine for processing the encoded speech signal to generate a speech recognized signal corresponding to the input speech signal, and the decoder configured to decode said speech recognized signal and to generate the output sequence in accordance with some embodiments of the present technology.

Figure 3:
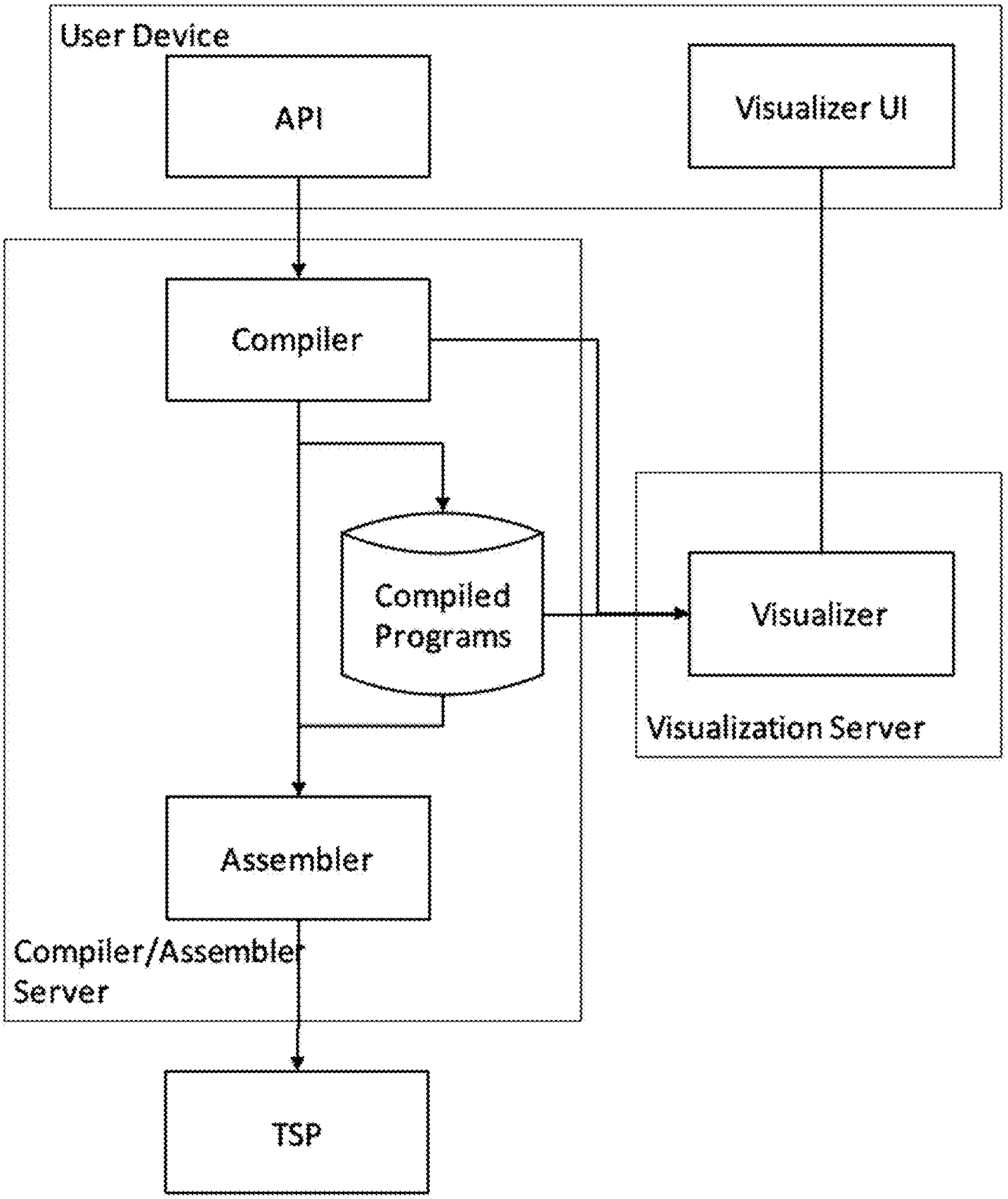

FIG. 3 illustrates a system for compiling a neural network model to be executed on a TSP in accordance with some embodiments of the present technology.

Figure 4A:
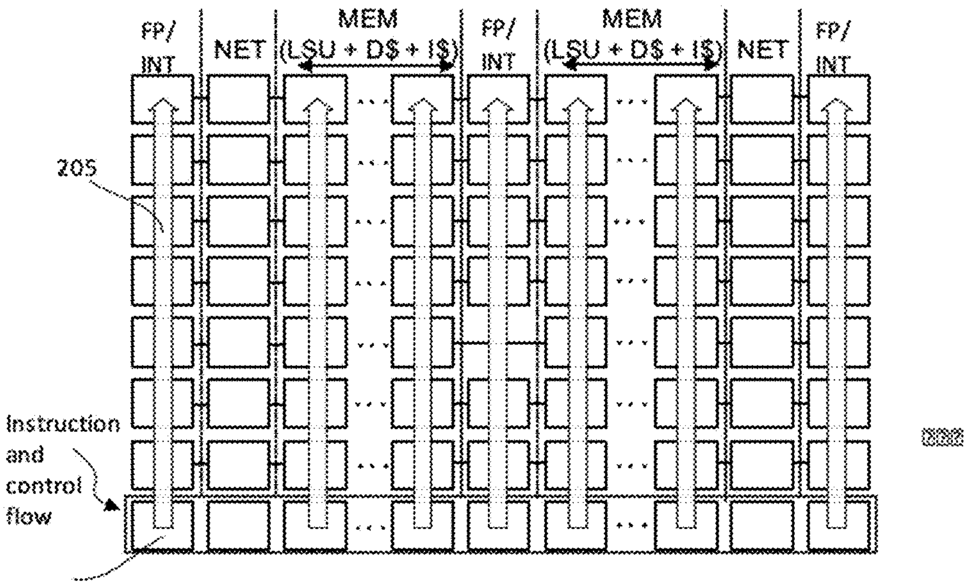

FIG. 4A depicts instruction and control flow in a processor having a functional slice architecture in accordance with some embodiments of the present technology.

Figure 4B:
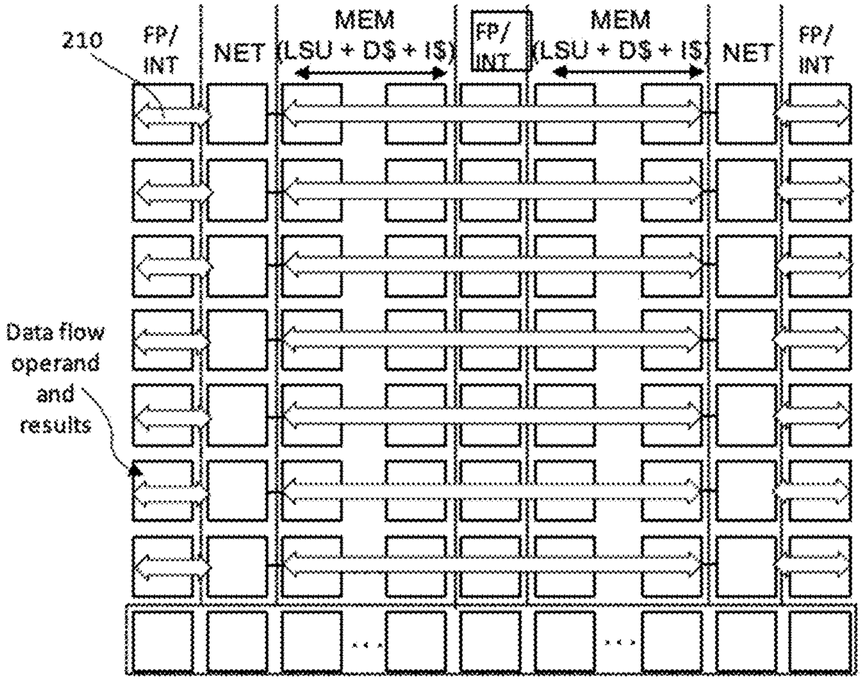

FIG. 4B illustrates data flow operand and results in a processor having a functional slice architecture in accordance with some embodiments of the present technology.

FIG. 5 illustrates an example command by importing the necessary libraries in accordance with some embodiments of the present technology.

FIG. 6 shows an example command by downloading the engine Bifrost which functions as the decoder in accordance with some embodiments of the present technology.

FIG. 7 depicts an example command by inputting to the engine a front-end of Mel Frequency Cepstral Coefficients (MFCC) module of the decoder in accordance with some embodiments of the present technology.

FIG. 8 illustrates a sample code for performing the cleaning of an audio file in accordance with some embodiments of the present technology.

FIG. 9 illustrates the throughput (samples per second) of Groq TSP and the Bifrost in accordance with some embodiments of the present technology.

FIG. 10 illustrates a first block in accordance with one or more embodiments provided herein.

FIG. 11A illustrates a first portion of a second block 2 in accordance with one or more embodiments provided herein.

FIG. 11B illustrates a second portion of the second block 2 in accordance with one or more embodiments provided herein.

FIG. 12 illustrates a third block in accordance with one or more embodiments provided herein.

FIG. 13 illustrates the fourth block in accordance with one or more embodiments provided herein.

FIG. 14 illustrates text that is truncated along the right margin of FIG. 13 in accordance with one or more embodiments provided herein.

FIGS. 15A and 15B illustrate the fifth, sixth, and seventh blocks in accordance with one or more embodiments provided herein.

In the Figures, reference signs can be omitted as is consistent with accepted engineering practice; however, a skilled person will understand that the illustrated components are understood in the context of the Figures as a whole, of the accompanying writings about such Figures, and of the embodiments of the claimed technology.

Detailed Description

The Figures and Detailed Description, only to provide knowledge and understanding, signify at least one embodiment of a claimed technology (ECIN). To minimize the length of the Detailed Description, while various features, structures or characteristics can be described together in a single embodiment, they also can be used in other embodiments without being written about. Variations of any of these elements, and modules, processes, machines, systems, manufactures, or compositions disclosed by such embodiments and/or examples are easily used in commerce. The Figures and Detailed Description signify, implicitly or explicitly, advantages and improvements of at least one ECIN for use in commerce.

In the Figures and Detailed Description, numerous specific details can be described to enable at least one ECIN. Any embodiment disclosed herein signifies a tangible form of a claimed technology. To not diminish the significance of the embodiments and/or examples in this Detailed Description, some elements that are known to a skilled person can be combined together for presentation and for illustration purposes and not be specified in detail. To not diminish the significance of these embodiments and/or examples, some well-known processes, machines, systems, manufactures, or compositions are not written about in detail. However, a skilled person can use these embodiments and/or examples in commerce without these specific details or their equivalents. Thus, the Detailed Description focuses on enabling the inventive elements of any ECIN. Where this Detailed Description refers to some elements in the singular tense, more than one element can be depicted in the Figures and like elements are labeled with like numerals.

FIG. 1 illustrates an equivalent neural network model in accordance with one embodiment of the present technology that replaces a prior art Seq2Seq model. Box 10 represents the input data transferred to the bottom block 12, which is the input to the neural network 14. The equivalent model creates n parallel streams of computation where n is an integer greater than 1. Each of these computation streams comprise a sequence of mathematical operations. Each stream is structured to perform an equivalent number of operations in the same number of blocks.

This means that for each time step, data that arrives at the inputs of each stream at time T1 and result data exits at time T2 for all streams. Each stream performs an equal (or equivalent) amount of compute comprising a sequence of computations. Each sequence of computation may comprise different mathematical operations or similar mathematical operations in a different sequence.

In an embodiment of the present technology, to illustrate, one sequence may comprise the mathematical operations ADD, then MULT, then TRANSPOSE while another stream may compute the mathematical operations of TRANSPOSE, then MULT, then ADD.

In an embodiment of the present technology, each stream performs an identical sequence of mathematical operations.

So, using the given above highway analogy, there is no off-ramp and on-ramp movement of data on the data highway because the data is just moving forward right from one end and exits on the other end by using five parallel data lanes with the same speed.

Referring still to FIG. 1, each parallel block of the neural network model (speech-to-text encoder) comprises two major blocks: a compute block 16 and a multi-head self-attention block 18.

In an embodiment of the present technology the compute block 16 comprises a 1D convolution neural network (CNN) that performs dilation parameterization.

A 1D convolutional neural network (CNN) is a type of neural network that is used to process 1-dimensional data, such as time series data. It is composed of one or more convolutional layers, which are responsible for learning the features of the input data. A dilated convolution is a technique that expands the kernel (input) by inserting holes between its consecutive elements. In simpler terms, it is the same as convolution, but it involves pixel skipping, so as to cover a larger area of the input.

Dilated convolution is a type of convolution operation used in convolutional neural networks (CNNs) that enables the network to have a larger receptive field without increasing the number of parameters.

In a regular convolution operation, a filter of a fixed size slides over the input feature map, and the values in the filter are multiplied with the corresponding values in the input feature map to produce a single output value. The receptive field of a neuron in the output feature map is defined as the area in the input feature map that the filter can "see." The size of the receptive field is determined by the size of the filter and the stride of the convolution.

In contrast, in a dilated convolution operation, the filter is "dilated" by inserting gaps between the filter values. The dilation rate determines the size of the gaps, and it is a hyperparameter that can be adjusted. When the dilation rate is 1, the dilated convolution reduces to a regular convolution.

The increased dilation rate effectively increases the receptive field of the filter without increasing the number of parameters, because the filter is still the same size, but with gaps between the values. This can be useful in situations where a larger receptive field is needed, but increasing the size of the filter would lead to an increase in the number of parameters and computational complexity.

More specifically, the CNN layer employs a "dilation" parameter to control the spacing between the values in the input that are being convolved.

In a standard 1D convolution, the convolutional filter slides over the input, with a fixed stride, and computes the dot product of the filter weights and the input values at each position. This process is repeated for every position in the input, and the output is a new feature map with a reduced spatial dimensionality.

On the other hand, a 1D convolutional filter with dilation rate 2 is a filter that has gaps of size 2 between its values. This means that the filter considers every other value in the input data, effectively doubling the receptive field of the filter. The output of a 1D convolutional filter with dilation rate 2 is a feature map that represents the learned features of the input data, with a larger receptive field than a regular 1D convolutional filter. The 1D convolutional filter with dilation rate n is a filter that has gaps of size n between its values, Referring still to FIG. 1, in an embodiment of the present technology, the neural network 14 comprises five 1D dilation parameterized compute blocks 16 each having a different dilation parameter.

In an embodiment of the present technology, referring still to FIG. 1, the neural network 14 comprises five dilation 1D parameterized compute blocks 16, wherein the first compute block 16 comprises 1D dilation parameterized compute block with dilation rate 1; wherein the second compute block 16 comprises 1D dilation parameterized compute block with dilation rate 2; wherein the third compute block 16 comprises 1D dilation parameterized compute block with dilation rate 3; wherein the fourth compute block 16 comprises 1D dilation parameterized compute block with dilation rate 4; and wherein the fifth compute block 16 comprises 1D dilation parameterized compute block with dilation rate 5.

The kernel size in a convolutional neural network (CNN) refers to the size of the filter that is applied to the input data. The kernel size is a hyperparameter that can be adjusted to control the size of the receptive field of the filter. A larger kernel size will result in a larger receptive field, which means that the filter can "see" more of the input data.

By way of example, the dilation basically controls which part of the input each stream is processing at a particular time. If, in one embodiment, the kernel size of the convolution is 3 in the first stream, then subsequent streams will have a kernel size of 3 but the bigger dilation will cause a different window at a particular time to select the input data for the parameterized convolutions.

In an embodiment of the present technology, referring still to FIG. 1, after the convolution, each data stream is processed by using a multi headed self-attention block 18.

Multi-headed self-attention block is a module for attention mechanisms that runs through an attention mechanism several times in parallel. The independent attention outputs are then concatenated and linearly transformed into the expected dimension.

This module is commonly used in natural language processing (NLP) tasks such as machine translation, text classification, and sentiment analysis.

Multi-headed Attention is a module for attention mechanisms which runs through an attention mechanism several times in parallel. The independent attention outputs are then concatenated and linearly transformed into the expected dimension. Intuitively, multiple attention heads allow for attending to parts of the sequence differently (e.g., longer-term dependencies versus shorter-term dependencies).

In an embodiment of the present technology, referring still to FIG. 1, after the convolution, each data stream has its own self-attention network that is equal in size to the other self-attention networks. Accordingly, each does the same amount of compute. The input to each multi headed self-attention is the output of the corresponding dilation parameterized convolution.

Because the output of the convolutions is different, the input to the multi-headed self-attention network for each stream will be different. Similarly, the output from each stream is also different but each stream basically works on the same size of the input so the compute in this case is also equal.

Multi-headed self-attention networks are useful for natural language processing tasks because they allow the network to attend to different parts of the input simultaneously and learn different representations for different parts of the input.

More specifically, multi-head self-attention is a technique used in language translation that splits word embedding into multiple chunks, called heads. Each head is passed through a separate set of attention weights.

The attention heads output their own attention filters, which in turn output their own filtered value matrices. Each attention filter zooms in on different combinations of linguistic features.

Here are some steps for using multi-head self-attention in language translation: (i) the word embedding is split into multiple chunks, called heads; (ii) the self-attention is applied on each head; (iii) all outputs are concatenated together into a tensor of shape (batch size, sequence length, values dimensionality); and (iv) the result is passed through one final dense layer.

The optimal number of heads for multi-head attention is typically chosen based on the specific task and the available computational resources. Using more heads allows the model to attend to more aspects of the input sequence in parallel, potentially leading to better performance.

In an embodiment of the present technology, as shown in FIG. 1, model 14 further includes a language model head 20 that functions as a feed forward linear layer or multilayer perceptron. The feedforward linear layer brings the output of each stream together and outputs one different definitive answer.

In an embodiment of the present technology, more specifically, the feedforward linear layer looks at the five streams and makes one common decision based on the input.

In an embodiment of the present technology, the number of streams and the size of streams is configurable and can be changed in accordance with each specific problem. Once the problem is defined, for example, a speech recognition problem, based on level of accuracy of the speech recognition system, the level of accuracy can be adjusted simply by increasing the number of streams run in parallel as well as also increase the size of each stream by introducing more convolutions and bigger attention blocks. Thus, the model basically has a larger representational capacity to make predictions on increasingly complex sequences.

In an embodiment of the present technology, model 14 (FIG. 1) could be adjusted so that it is a little less efficient by decreasing the number of streams or the size of a stream or a combination of the two.

In an embodiment of the present technology, model 14 (FIG. 1) further includes a temporal phoneme probability matrix 22. The output of matrix 22 predicts phonemes. Phonemes are basically the smallest units of sounds in a language so that for each time step a probability result is determined.

For example, in the simplest way to treat phonemes as letters from A-Z and the temporal phoneme probability matrix 22 generates a probability that such letter has been spoken at the first time step, and for the next time step the temporal phoneme probability matrix 22 generates a probability that such letter has been spoken at that time step.

Thus, the output of the temporal phoneme probability is post processed and converted into actual text.

According to an embodiment of the present technology, FIG. 2 is a high-level illustration where a Seq2Seq architecture includes an encoder 24 (shown in more details in FIG. 1) that is responsible for processing an input sequence 26 from a user 28 and produces a fixed-length context vector, which is used by Groq Bi frost Engine 32 to generate the speech-recognized signal that feeds the decoder 30 to generate the output sequence.

In an embodiment of the present technology, the encoder 24 of FIG. 2 is implemented by using a recurrent neural network (RNN) having hidden states.

In an embodiment of the present technology, the encoder 24 of FIG. 2 is implemented by using a transformer architecture that comprises an encoder and a decoder, which can be used separately or in combination as an encoder-decoder model.

In an embodiment of the present technology, the encoder 24 of FIG. 2 is implemented by using a Groq TSP processor.

In an embodiment of the present technology, the encoder 24 of FIG. 2 is implemented by using Field Programmable Gate Arrays (FPGA). zzz Field Programmable Gate Arrays (FPGAs) are a type of hardware that can be programmed to implement neural networks. FPGAs can be reconfigured to best fit a neural network's processing demands.

Indeed, FPGAs are a flexible, low-latency architecture that enables deep learning acceleration in a power-efficient solution. They provide adaptable, high-performance solutions that exceed traditional GPUs and CPUs.

FPGAs are made up of many programmable logic blocks such as look-up tables (LUT), memory, and reconfigurable connections. The circuitry inside an FPGA chip is not hard etched, so it can be reprogrammed as needed.

FPGAs are a good choice for specific applications that demand hardware acceleration and real-time processing. For example, FPGA-accelerated large language models can be used for a wide range of natural language processing tasks, including text generation, translation, summarization, and sentiment analysis.

Referring still to FIG. 2, the input sequence is processed one step at a time by using speech-to-text encoder 24 shown in more details in FIG. 1.

At each time step, the encoder takes in the current word in the input sequence and updates its hidden state. The hidden state captures the information about the input sequence up to that point, which is then used to compute the hidden state at the next time step. This process is repeated until the end of the input sequence is reached.

The encoder's final hidden state is typically used as the context vector that is typically passed to the decoder. The context vector captures the meaning of the entire input sequence, so it provides the decoder with a compact representation of the input that the decoder can use to generate the output sequence. The encoder outputs numerical values that represent the meaning of speech.

Additionally, the encoder also generates a set of hidden states, one for each input token. This set of hidden states is also passed to the decoder, the decoder uses these hidden states to attend to the relevant parts of the input sequence.

The attention mechanism computes a weighted sum of the encoder's hidden states, where the weights are computed based on the similarity between the decoder's current hidden state and the encoder's hidden states. The similarity between the decoder's current hidden state and the encoder's hidden states is determined by using the inner product (or dot product).

This weighted sum is used as input to the decoder at each time step, allowing the decoder to focus on the most relevant parts of the input sequence.

The encoder is responsible for understanding the inputs, for example in the case of a speech transcription program. The encoder basically understands speech at a fundamental level and then the decoder, which runs in a step-by-step manner converts the understanding of the encoder into actual text. The encoder provides real-time understanding, and the decoder is responsible for converting into actual output.

As noted earlier, most such Seq2Seq models are very inefficient because they run in a step-by-step fashion. More specifically the Seq2Seqmodel runs in a step-by-step fashion to convert the output of the encoder into actual text, this means that the decoder generates one word of the output sequence at a time, based on the context vector produced by the encoder and the previously generated words.

Referring still to FIG. 2, in an embodiment of the present technology, the speech recognition engine is implemented by using the Bifrost model 32.

At each step, the Bifrost engine 32 uses the context vector, which represents the entire input sequence, and its own hidden state, which represents the previously generated words, to produce a probability distribution over the vocabulary for the next word in the output sequence.

The word with the highest probability is then chosen and added to the output sequence, and the Bifrost engine 32 hidden state is updated. This process is repeated until the Bifrost engine 32 generates the end-of-sequence token or a maximum length is reached.

Therefore, the Bifrost engine 32 generates the output sequence one word at a time, based on the context vector and its own hidden state, in a step-by-step fashion. This is also known as "auto-regressive" generation, as the Bifrost engine 32 generates the next word based on the previously generated words in the sequence.

Signal conditioning is a process of data acquisition that manipulates a signal to prepare it for the next stage of processing. A signal conditioner is an instrument that performs this process. It converts one type of electrical or mechanical signal (input-signal) into another (output-signal).

Referring still to FIG. 2, more specifically, the efficient Bifrost model 32 works directly on the conditioned input signal as well as the output of the encoder. Delivering both inputs to Bifrost engine 32 enables a more accurate prediction as well as accelerates the models' speech to text output.

In one embodiment of the present technology, as illustrated in FIG. 2, using Bifrost model can accelerate a speech recognition module (speech to text) by achieved so far 33 X.

The increasing reliance of modern industry on artificial intelligence has resulted in a growing demand for specialized microprocessors that perform the tensor calculations (such as vector-matrix and matrix-matrix multiplications) important to many artificial intelligence techniques such as gradient descent techniques for the training of artificial neural networks. Some of these tensor processors perform over one trillion floating point operations (teraflops) per second, which not surprisingly, require large amounts of power.

In one embodiment of the present technology, as illustrated in FIG. 2, the Bifrost model 32 is implemented by using Groq TSP.

The speech-recognized signals generated by Bifrost engine 32 are output to a decoder 30 that efficiently runs a standard algorithm.

In one embodiment of the present technology, decoder 30 of FIG. 2 is implemented by using the decoder part of the encoder-decoder Transformer model.

In one embodiment of then present technology, the decoder 30 of FIG. 2 is implemented by using the Generative Pre-trained Transformers (GPT) model.

In one embodiment of the present technology, decoder 30 of FIG. 2 is implemented by using FPGAs.

In one embodiment of the present technology, FIG. 3 illustrates a system for compiling a model to be executed on the tensor processor.

In one embodiment of the present technology, FIG. 3 illustrates a system for compiling a model to be executed on the Groq TSP.

The system of FIG. 3 includes a user device, a server, and a processor. Each of these components, and their subcomponents (if any) are described in greater detail below.

Although a particular configuration of components is described herein, in other embodiments the system of FIG. 3 has different components, and these components perform the functions of the system of FIG. 3 in a different order or using a different mechanism.

For example, while FIG. 3 illustrates a single server, in other embodiments, compilation, assembly, and power usage functions are performed on different devices. For example, in some embodiments, at least a portion of the functions performed by the server are performed by the user device.

The user device of FIG. 3 comprises any electronic computing device, such as a personal computer, laptop, or workstation, which uses an Application Program Interface (API) to construct programs to be run on the processor. The server receives a program specified by the user at the user device and compiles the program to generate a compiled program. In some embodiments, a compiled program enables a data model for predictions that processes input data and makes a prediction from the input data. Examples of predictions are category classifications made with a classifier, or predictions of time series values. In some embodiments, the prediction model describes a machine learning model that includes nodes, tensors, and weights.

In one embodiment, the prediction model is specified as a TensorFlow model, the compiler is a TensorFlow compiler, and the processor is a tensor processor.

In another embodiment, the prediction model is specified as a PyTorch model, the compiler is a PyTorch compiler.

In other embodiments, other machine learning specification languages and compilers are used. For example, in some embodiments, the prediction model defines nodes representing operators (e.g., arithmetic operators, matrix transformation operators, Boolean operators, etc.), tensors representing operands (e.g., values that the operators modify, such as scalar values, vector values, and matrix values, which may be represented in integer or floating-point format), and weight values that are generated and stored in the model after training.

In some embodiments, where the processor is a tensor processor having a functional slice architecture, the compiler generates an explicit plan for how the processor will execute the program, by translating the program into a set of operations that are executed by the processor, specifying when each instruction will be executed, which functional slices will perform the work, and which stream registers will hold the operands. This type of scheduling is known as "deterministic scheduling." This explicit plan for execution includes information for explicit prediction of excessive power usage by the processor when executing the program.

The assembler of FIG. 3 receives compiled programs, generated by the compiler, and performs final compilation and linking of the scheduled instructions to generate a compiled binary.

In some embodiments, the assembler of FIG. 3 maps the scheduled instructions indicated in the compiled program to the hardware of the server, and then determines the exact component queue in which to place each instruction.

The processor of FIG. 3, for example, is a hardware device with a massive number of matrix multiplier units that accepts a compiled binary assembled by the assembler, and executes the instructions included in the compiled binary. The processor typically includes one or more blocks of circuity for matrix arithmetic, numerical conversion, vector computation, short-term memory, and data permutation/switching.

In one embodiment, the processor is a tensor processor having a functional slice architecture.

In one embodiment, such processor is Groq TSP tensor processor having a functional slice architecture.

In one embodiment, the processor of FIG. 3 comprises multiple tensor processors connected together.

Example Processor

In one embodiment of the present technology, FIG. 4A depicts instruction and control flow 205 in a processor having a functional slice architecture in accordance with some embodiments of the present technology.

In one embodiment of the present technology, FIG. 4B depicts operand and results flow 210 in a processor having a functional slice architecture.

In one embodiment of the present technology, the processor is an application specific integrated circuit (ASIC) and corresponds to the processor illustrated in FIG. 3.

The functional units of processor (also referred to as "functional tiles") are aggregated into a plurality of functional process units (hereafter referred to as "slices"), each corresponding to a particular function type in some embodiments. For example, different functional slices of the processor correspond to processing units for MEM (memory), VXM (vector execution module), MXM (matrix execution module), NIM (numerical interpretation module), and SXM (switching and permutation module). In other embodiments, each tile may include an aggregation of functional units such as a tile having both MEM and execution units by way of example.

As illustrated in FIGS. 4A and 4B, each slice corresponds to a column of N functional units extending in a direction different (e.g., orthogonal) to the direction of the flow of data. The functional units of each slice can share an instruction queue (not shown) that stores instructions, and an instruction control unit (ICU) that controls execution flow of the instructions.

The instructions in a given instruction queue are executed only by functional units in the queue's associated slice and are not executed by another slice of the processor. In other embodiments, each functional unit has an associated ICU that controls the execution flow of the instructions.

The processor also includes communication lanes to carry data between the functional units of different slices. Each communication lane connects to each of the slices of processor.

In some embodiments, a communication lane that connects a row of functional units of adjacent slices is referred to as a "super-lane," and comprises multiple data lanes, or "streams," each configured to transport data values along a particular direction.

For example, in some embodiments, each functional unit of the processor is connected to corresponding functional units on adjacent slices by a super-lane made up of multiple lanes. In other embodiments, the processor includes communication devices, such as a router, to carry data between adjacent functional units.

By arranging the functional units of the processor into different functional slices, the on-chip instruction and control flow of the processor is decoupled from the data flow. Since many types of data are acted upon by the same set of instructions, what is important for visualization is visualizing the flow of instructions, not the flow of data.

In some embodiments, FIG. 4A illustrates the flow of instructions within the processor architecture, while FIG. 4B illustrates the flow of data within the processor architecture. As illustrated in FIGS. 4A and 4B, the instructions and control signals flow in a first direction across the functional units of processor (e.g., along the length of the functional slices), while the data flows in a second direction across the functional units of processor (e.g., across the functional slices) that is non-parallel to the first direction, via the communication lanes (e.g., super-lanes) connecting the slices.

In some embodiments, the functional units in the same slice execute instructions in a 'staggered' fashion where instructions are issued tile-by-tile within the slice over a period of N cycles. For example, the ICU for a given slice may, during a first clock cycle, issues an instruction to a first tile of the slice (e.g., the bottom tile of the slice closest to the ICU), which is passed to subsequent functional units of the slice over subsequent cycles. That is, each row of functional units (corresponding to functional units along a particular super-lane) of processor executes the same set of instructions, albeit offset in time, relative to the functional units of an adjacent row.

The functional slices of the processor are arranged such that operand data read from a memory slice is intercepted by different functional slices as the data moves across the chip, and results flow in the opposite direction where they are then written back to memory. For example, a first data flow from a first memory slice flows in a first direction (e.g., towards the right), where it is intercepted by a VXM slice that performs a vector operation on the received data. The data flow then continues to an MXM slice which performs a matrix operation on the received data. The processed data then flows in a second direction opposite from the first direction (e.g., towards the left), where it is again intercepted by VXM slice to perform an accumulate operation, and then written back to the memory slice.

In some embodiments, the functional slices of the processor are arranged such that data flow between memory and functional slices occur in both the first and second directions. For example, a second data flow originating from a second memory slice that travels in the second direction towards a second slice, where the data is intercepted and processed by VXM slice before traveling to the second MXM slice. The results of the matrix operation performed by the second MXM slice then flow in the first direction back towards the second memory slice.

In some embodiments, stream registers are located along a super-lane of the processor, in accordance with some embodiments. The stream registers are located between functional slices of the processor to facilitate the transport of data (e.g., operands and results) along each super-lane. For example, within the memory region of the processor, stream registers are located between sets of four MEM units. The stream registers are architecturally visible to the compiler and serve as the primary hardware structure through which the compiler has visibility into the program's execution. Each functional unit of the set contains stream circuitry configured to allow the functional unit to read or write to the stream registers in either direction of the super-lane.

In some embodiments, each stream register is implemented as a collection of registers, corresponding to each stream of the super-lane, and sized based upon the basic data type used by the processor (e.g., if the TSP's basic data type is an INT8, each register may be 8-bits wide).

In some embodiments, in order to support larger operands (e.g., FP16 or INT32), multiple registers are collectively treated as one operand, where the operand is transmitted over multiple streams of the super-lane.

All of these functional features—superlanes of functional units, slices of instruction flow, handling of different types of integers and floating-point numbers, occurring trillions of times a second, create complicated power flows and possible disruptive power fluctuations that could negatively impact the performance of the processor. However, given the deterministic nature of executions by the processor, any disruptive power fluctuations (such as voltage droop) can be determined before execution of the program, with information (such as processor instructions, and timing for such instructions) about such fluctuations being supplied by the compiler to the processor, for the processor to use during program execution to mitigate the fluctuations.

The present technology provides fast and accurate transcriptions because, unlike traditional transformer-based models that rely on slow and sequential recurrence network during recurrence inference, the Groq Bifrost engine (of FIG. 2) takes the entire speech signal in once and forwards it in a very simple manner without any complicated post processing.

DeepSpeech2 is a set of speech recognition models based on Baidu DeepSpeech2 model. The preprocessing part takes a raw audio waveform signal and converts it into a log-spectrogram of size (N_timesteps, N_frequency_features). N_timesteps depends on an original audio file's duration, N_frequency_features can be assigned in the model's configuration file as "num_audio_features" parameter.

The Deep Neural Network (DNN) part produces a probability distribution P_t(c) over vocabulary characters c per each time step t. DeepSpeech2 is trained with CTC loss.

CTC is an algorithm used to train deep neural networks in speech recognition, handwriting recognition and other sequence problems. CTC is used if a priori is known how the input aligns with the output (how the characters in the transcript align to the audio).

The Groq Bifrost engine (of FIG. 2) is similar to DeepSpeech2 while decoding for the temporal distribution of phonemes probabilities. The engine is trained to be robust to minimize CTC loss. Label data does not need to be aligned.

Logits are the outputs of a neural network before the activation function is applied. They are the unnormalized probabilities of the item belonging to a certain class. Logits are often used in classification tasks, where the goal is to predict the class label of an input. Greedy decoding takes the maximum probable character at each instant and uses it as the output. This is a simple implementation that does not consider context.

Connectionist temporal classification (CTC) is a type of neural network output and associated scoring function. CTC is used for training recurrent neural networks (RNNs) to tackle sequence problems where the timing is variable.

Greedy CTC recording is a type of neural network output that performs greedy decoding on the logits given in input.

The greedy decoder can predict incorrectly spelled words like "affrayd" and "shoktd." The transcript with the lexicon-constrained beam search decoder produces a more accurate result consisting of real words.

In one embodiment of the present technology, the decoder 30 of FIG. 2 includes the Greedy CTC recording configured to provide accurate transcriptions.

Thus, the Groq Bifrost engine can avoid and/or mitigate any post processing transactions or any sort of recurrence infinite inference.

More specifically, as was explained above, the speech-to-text encoder 24 of FIG. 2 breaks the speech signal into multiple streams that work in parallel. The streams are dilation parameterized extract different relational features across speech windows but are equally computed and synchronous. The streams look for speech features higher level relationships in the audio. The output of the speech signal is fed into a language model head and outcomes the phoneme probability matrix.

Unlike other platforms based on GPU or CPU processing units, there is no need to know the length of the speech signals beforehand with the disclosed embodiments. Also, when a model is processed by a streaming processor such as the TSP available from Groq, Inc, there is low latency for a smooth user experience.

The speech-to-text encoder 24 of FIG. 2 also provides high throughput capable of supporting hundreds of millions of queries per second when running on Groq's TSP.

To implement the engine of the disclosed embodiments on the Groq TSP, there are several steps.

In an embodiment of the present technology, FIG. 5 illustrates an example command by importing the necessary libraries.

In an embodiment of the present technology, FIG. 6 shows an example command by downloading the engine Bifrost which functions as the decoder.

In an embodiment of the present technology FIG. 7 depicts an example command by inputting to the engine a front-end of Mel Frequency Cepstral Coefficients (MFCC) module of the decoder.

In an embodiment of the present technology FIG. 8 illustrates a sample code for performing the cleaning of an audio file.

In an embodiment of the present technology FIG. 9 shows the throughput (samples per second) of Groq TSP and the Bifrost.

DETAILED DESCRIPTION

The following are the definitions of a set of global configuration parameters for a speech recognition model and sets up the environment for training the model.

The configuration parameters include:

'target_batch_size': The target batch size for training the model.

'batch_size_single_gpu': The batch size for training the model on a single GPU.

'use_specaug': Whether to use SpecAugment or not.

'precision': The precision for the model's weights.

'dropout': The dropout rate for the model.

'num_layers': The number of layers in the model.

'num_out_channels': The number of output channels in the model.

'dilation_per_stream_index': The dilation rate for each stream in the model.

'num_convld_blocks': The number of 1D convolutional blocks in the model.

'num_attention_heads': The number of attention heads in the model.

'freeze_encoder': Whether to freeze the encoder during training.

'freeze_decoder': Whether to freeze the decoder during training.

'freeze_lm_head': Whether to freeze the language model head during training.

The code also sets up the environment for training the model by importing necessary libraries, such as 'torch', 'torchaudio', 'numpy', and 'ipython'. The code also sets environment variables for GroqFlow, including 'GROQFLOW_SKIP_SDK_CHECK', 'GROQMODEL_BACKEND', and 'GROQFLOW_BAKE_SDK', and sets the seed for consistency.

The function of this code is to define the configuration parameters and set up the environment for training a speech recognition model using GroqFlow.

FIG. 10 illustrates a first block in accordance with one or more embodiments provided herein.

```
+ ------------ +
| Import Libraries |
+ ------------ +
   |
   |
   V
+ ------------ +
| Define Configuration |
| Import Libraries |
+ ------------ +
   |
   |
   V
+ ------------ +
| Set Environment Variables |
+ ------------ +
   |
   |
   V
+ ------------ +
| Set Seed for Consistency |
+ ------------ +
   |
   |
   V
+ ------------ +
| Define Model and Optimizer |
+ ------------ +
   |
   |
   V
+ ------------ +
| Train Model |
```

In this flow graph, the first block represents the import of necessary libraries, including 'torch', 'torchaudio', 'numpy', and 'ipython'.

FIG. 11A illustrates a first portion of a second block 2 and FIG. 11B illustrates a second portion of the second block 2 in accordance with one or more embodiments provided herein.

Interpretation.

Block 2 defines the configuration parameters for the model, including the target batch size, batch size for single GPU, and various other parameters related to the model's architecture and training.

In this section, a model for speech-to-text conversion is defined that consists of several components:

1. Feature Extractor: The first component of the model is a feature extractor, which processes the input audio data and extracts relevant features. The feature extractor used in this implementation is a pre-trained model from the "facebook/s2t-medium-librispeech-asr" repository. The specific model used is a convolutional neural network (CNN) that takes the input audio data and outputs a sequence of feature maps.
2. Tokenizer: The second component of the model is a tokenizer, which converts the input audio data into a sequence of phonemes (units of sound). The tokenizer used in this implementation is a PhonemeTokenizer, which maps the input audio data to a sequence of phonemes based on their acoustic properties.
3. Multi-Stream Model: The third component of the model is a multi-stream model, which processes the sequence of phonemes and outputs a sequence of hidden states. The multi-stream model is defined using the MultiStreamModel class, and it consists of several components:

*num_layers: The number of layers in the model. In this implementation, the multi-stream model has two layers.

*num_in_channels: The number of input channels to the model. In this implementation, the multi-stream model takes the output of the feature extractor, which has 64 channels.

*num_out_channels: The number of output channels from the model. In this implementation, the multi-stream model outputs 256 channels.

*kernel_size: The size of the convolution kernel used in the model. In this implementation, the kernel size is 3.

*dilation_per_stream_index: A list of dilations to apply to each stream in the model. In this implementation, the dilation rate is set to 1 for all streams.

*dropout: The dropout rate to apply to the model. In this implementation, the dropout rate is set to 0.1.

*num_convld_blocks: The number of 1D convolutional blocks to use in the model. In this implementation, the multi-stream model uses two 1D convolutional blocks

*num_attention_heads: The number of attention heads to use in the model. In this implementation, the multi-stream model uses eight attention heads.

*classifier_dropout: The dropout rate to apply to the classifier in the model. In this implementation, the classifier dropout rate is set to 0.1.

*num_classes: The number of classes in the model. In this implementation, the multi-stream model has 10 classes.
4. Encoder Model: The fourth component of the model is an encoder model, which processes the input audio data and outputs a sequence of hidden states. The encoder model used in this implementation is a pre-trained Speech2TextForConditionalGeneration model from the "facebook/s2t-medium-librispeech-asr" repository. The encoder model is a transformer-based model that takes the output of the feature extractor and outputs a sequence of hidden states.

5. Language Model Head: The fifth component of the model is a language model head, which predicts the next word in the sequence given the previous words. The language model head used in this implementation is the lm_head attribute of the encoder model. The language model head is a linear layer that takes the output of the encoder model and outputs a probability distribution over the vocabulary of the model.
6. Overall Model: The overall model combines the feature extractor, multi-stream model, encoder model, and language model head. The overall model is defined using the ModifiedS2T class, and it takes the following parameters:
   s2t_encoder: The encoder model.
   multi_stream_model: The multi-stream model.
   s2t_lm: The language model head.
   num_classes: The number of classes in the model.\
   blank_label_id: The ID of the blank label in the model.
   config: The configuration parameters for the model.
   ctc_decoder: An optional CTC decoder. In this implementation, the CTC decoder is not used, and the parameter is set to None.

The model is then loaded from a checkpoint using the torch.load function, and the model is set to evaluation mode using the model.eval( ) function.

```
+----------------+
| Audio Data |
+----------------+
+----------------+
| Feature Extractor |
+----------------+
 |
 |
 V
+----------------+
| Tokenizer |
+----------------+
 |
 V
+----------------+
| Multi-Stream |
| Model |
+----------------+
 |
 |
 V
+----------------+
| Encoder Model |
```

-continued

```
+----------------+
 |
 |
 V
| Language Model |
| Head |
+----------------+
 |
 |
 V
+----------------+
| Overall Model |
+----------------+
 |
 |
 V
+----------------+
| Predictions |
+----------------+
'''
```

The flow graph shows the audio data entering the feature extractor, which extracts relevant features from the audio data. The output of the feature extractor is then passed through the tokenizer, which converts the audio data into a sequence of phonemes. The output of the tokenizer is then passed through the multi-stream model, which processes the sequence of phonemes and outputs a sequence of hidden states. The output of the multi-stream model is then passed through the encoder model, which processes the sequence of hidden states and outputs a sequence of hidden states. Finally, the output of the encoder model is passed through the language model head, which predicts the next word in the sequence given the previous words. The overall model combines the feature extractor, multi-stream model, encoder model, and language model head to generate the final predictions.

FIG. 12 illustrates a third block in accordance with one or more embodiments provided herein.

The third block sets environment variables for GroqFlow, including: 'GROQFLOW_SKIP_SDK_CHECK', 'GROQMODEL_BACKEND', and 'GROQFLOW_BAKE_SDK'.

The Unformatted Third Block of Code.

MAX_SEQ_LEN=2048 dummy_inputs_encoder={"input_features": torch.rand(1, MAX_SEQ_LEN, 80, dtype=torch.float32), "attention_ mask": torch.ones(1, MAX_SEQ_LEN, dtype=torch.int32),} # prepare dummy inputs to compile bifrost decoder_model=torch.nn.Sequential(model.decoder, model.lm_head, model.linear) dummy_inputs_decoder= {"input": model.encoder(**dummy_inputs_encoder)[0].permute(0, 2, 1).detach( )} # groq the model compiler_ flags=["--ia-mode=all"] build_name=f"s2t_bifrost" groq_bifrost_model=groqit(decoder_model, dummy_inputs_decoder, build_name=build_name, num_chips=8, rebuild="never",)

This code block is preparing dummy inputs for the encoder and decoder models and then using the Groq compiler to build a Groq model from the given PyTorch model.

Interpretation.

The below represents a flow diagram illustrating the functionality of the code:

```
```
+---------------+
| Input Data |
+---------------+
        |
        |
        V
+---------------+
| Feature Extractor |
+---------------+
        |
        |
        V
+---------------+
| Encoder Model |
+---------------+
        |
        |
        V
+---------------+
| Decoder Model |
+---------------+
        |
        |
        V
+---------------+
| Dummy Inputs |
+---------------+
        |
        |
        V
+---------------+
| Groq Compiler |
+---------------+
        |
        |
        V
+---------------+
| Groq Model |
+---------------+
```
```

The flow diagram shows the input data entering the feature extractor, which extracts relevant features from the input data. The output of the feature extractor is then passed through the encoder model, which processes the sequence of phonemes and outputs a sequence of hidden states. The output of the encoder model is then passed through the decoder model, which generates the final predictions.

The code then prepares dummy inputs for the encoder and decoder models by creating random inputs with the same shape and size as the expected inputs. The dummy inputs are created using the 'torch.rand' function and are passed through the encoder and decoder models to generate dummy outputs.

The Groq compiler is then used to build a Groq model from the given PyTorch model. The Groq compiler takes the PyTorch model, dummy inputs, and various flags as input and generates a Groq model that can be run on a GPU. The 'build_name' parameter is used to specify the name of the Groq model, and the 'num_chips' parameter is used to specify the number of chips to use for the Groq model. The 'rebuild' parameter is used to specify whether the Groq model should be rebuilt when the PyTorch model changes.

The resulting Groq model can be used for inference on a GPU, which can significantly speed up the inference process compared to using the PyTorch model on a CPU.

The fourth block sets the seed for consistency. FIG. 13 illustrates the fourth block in accordance with one or more embodiments provided herein.

Text that is truncated along the right margin of FIG. 13 is illustrated in FIG. 14.

Text that is truncated along right margin is shown below:

```
test_files = {
    "audio_files/test_s2t_4.wav": { },
    "audio_files/test_s2t_3.wav": { },
#   "audio_files/test_s2t_2.wav": { },
    "audio_files/test_s2t.wav": { },
    "audio_files/audio_4.flac": { },
    "audio_files/audio_6.flac": { },
    "audio_files/audio_1.flac": { },
# "audio_files/audio_2.wav": { },
}
active_files = { }
max_seq_len = 2048
# run s2t encoder
for key in test_files.keys( ):
    audio, sample_rate = torchaudio.load(key)
    inputs = feature_extractor(audio[0], sampling_rate=16000,
return_tensors="pt")
    mfcc_data = inputs.input_features[0].unsqueeze(0)
    attention_data = inputs.attention_mask[0].unsqueeze(0)
    if mfcc_data.shape[1] <= max_seq_len:
    active_files[key] = { }
    mfcc_data = torch.concat([mfcc_data, torch.zeros(1,
    max_seq_len-mfcc_data.shape[1],
mfcc_data.shape[-1])], dim=1)
    attention_data = torch.concat([attention_data, torch.zeros(1,
max_seq_len-mfcc_data.shape[1], dtype=attention_data.dtype)], dim=1)
    active_files[key]["encoder_outputs_cpu"] =
torch.tensor(np.ascontiguousarray(model.encoder(mfcc_data,
attention_data)[0].permute(0,2,1).detach( ).numpy( )))
```

This code block is responsible for preparing the input data for the speech-to-text model. It loads audio files from a dictionary 'test_files' and processes them using a feature extractor and a s2t encoder. The processed data is then stored in a dictionary 'active_files'.

The code first loops through the keys of 'test_files' and loads the audio files using 'torchaudio.load( )'. It then extracts the audio data and sample rate using 'torchaudio.load( )' and passes it through a feature extractor function 'feature_extractor( )'. The feature extractor function takes the audio data and sample rate as input and returns a tuple containing the extracted features and the attention mask.

The code then checks if the length of the extracted features is less than or equal to a maximum sequence length 'max_seq_len'. If it is, the key is added to a dictionary 'active_files'. The code then pads the extracted features and attention mask with zeros to make their length equal to 'max_seq_len'.

The padded features and attention mask are then passed through the s2t encoder 'model.encoder( )' to generate the encoder outputs. The encoder outputs are then converted to a tensor and stored in 'active_files' under the key "encoder_outputs_cpu".

Interpretation

Below is a flow diagram illustrating the functionality of this code block:

```
+---------------+
| test_files |
+---------------+
```

-continued

```
      |
       |
         V
+----------------+
| torchaudio.load |
+----------------+
      |
       |
         V
+----------------+
| feature_extractor |
+----------------+
      |
      |
+----------------+
| mfcc_data |
+----------------+
     |
     |
      V
+----------------+
| attention_data |
+----------------+
```

-continued

```
      |
       V
+----------------+
| active_files |
+----------------+
      |
      |
       V
+----------------+
| model•encoder |
+----------------+
      |
      |
       V
+----------------+
| encoder_outputs_cpu |
+----------------+
```

The flow diagram shows the audio files being loaded from ‘test_files’ and passed through the feature extractor and s2t encoder to generate the encoder outputs, which are then stored in ‘active_files’.

The diagram illustrates the flow of data through the different components of the code block, with each component modifying or processing the data in some way before passing it on to the next component.

FIGS. 15A and 15B illustrate the fifth, sixth, and seventh blocks in accordance with one or more embodiments provided herein.

The flow diagram shows the audio files being loaded from ‘test_files’ and passes.

Unformatted Fifth block of code

```
# run bifrost on cpu
for key in active__files.keys( ): active__files[key][“bifrost__outputs__cpu”]
decoder__model(active__files[key][“encoder__outputs__cpu”])
# decode text on cpu
for key in active__files.keys( ):
   ipd.display(ipd.Audio(key))
   active__files[key][“text”] =
decoder.decode(active__files[key][“bifrost__outputs__cpu”].squeeze(0).detach( ).nump
y( ),
beam__width =500)
   print(active__files[key][“text”])
```

This code block has two main functions:

1. It runs the Bifrost decoder on the CPU to generate the decoder outputs for each active file.

2. It decodes the text for each active file using the decoder outputs.

Interpretation.

Below is a flow diagram illustrating the functionality of this code block:

```
'''
+----------------+
| active_files |
+----------------+
 |
 |
 V
+----------------+
| decoder_model |
+----------------+
 |
 |
 V
+----------------+
| bifrost_outputs_cpu |
+----------------+
 |
 |
 V
+----------------+
| decoder |
+----------------+
 |
 |
 V
+----------------+
| text |
+----------------+
 |
 |
 V
+----------------+
| print |
+----------------+
"
```

The flow diagram shows the active files being passed through the Bifrost decoder model to generate the decoder outputs, which are then used to decode the text for each active file. The decoded text is then printed to the console.

Here's a technical description of the functionality of each line of the code block:

1. 'for key in active_files.keys( ):': This line loops through the keys of the 'active_files' dictionary.
2. 'active_files[key]["bifrost_outputs_cpu"] decoder_model(active_files[key]["encoder_outputs_cpu"]):' This line runs the Bifrost decoder model on the CPU to generate the decoder outputs for the current active file. The decoder outputs are stored in the 'bifrost_outputs_cpu' key of the 'active_files' dictionary.
3. 'for key in active_files.keys( ):': This line loops through the keys of the 'active_files' dictionary again.
4. 'ipd.display(ipd.Audio(key))': This line displays the audio file associated with the current key using the IPython display system.
5. 'active_files[key]["text"]=decoder.decode(active_files[key]["bifrost_outputs_cpu"].squeeze(0).detach( ).numpy( ), beam_width=500)': This line decodes the text for the current active file using the decoder outputs generated by the Bifrost decoder model. The decoded text is stored in the 'text' key of the 'active_files' dictionary.
6. 'print(active_files[key]["text"])': This line prints the decoded text for the current active file to the console.

The code block can be summarized as follows: it runs the Bifrost decoder model on the CPU to generate decoder outputs for each active file, and then decodes the text for each active file using the decoder outputs. The decoded text is then printed to the console.

Unformatted Sixth Block of Code # import os os.environ['PYTHONPATH']='/opt/groq/runtime/site-packages/' # run bifrost on groq bifrost_outputs_groq=groq_bifrost_model.run_abunch([{"input": active_files[key]["encoder_outputs_cpu"]} for key in active_files.keys( )])

This code block is responsible for running the Bifrost decoder model on the Groq accelerator to generate the decoder outputs for each active file.

The below is a technical description of the functionality of this code block:

1. 'os.environ['PYTHONPATH']='/opt/groq/runtime/site-packages/']': This line sets the Python path environment variable to include the Groq runtime site-packages directory. This allows the code to import the Groq Bifrost model.
2. 'bifrost_outputs_groq=groq_bifrost_model.run_abunch([{"input": active_files[key]["encoder_outputs_cpu"]} for key in active_files.keys( )])': This line runs the Groq Bifrost model on the Groq accelerator to generate the decoder outputs for each active file. The input to the model is the encoder outputs for each active file, which are stored in the 'encoder_outputs_cpu' key of the 'active_files' dictionary. The output of the model is a list of decoder outputs, which are stored in the 'bifrost_outputs_groq' variable.

Interpretation.

Below is a flow diagram illustrating the functionality of this code block:

```
'''
+----------------+
| active_files |
+----------------+
 |
 |
 V
+----------------+
| encoder_outputs_cpu |
+----------------+
 |
```

-continued

```
|
V
+----------------+
| groq_bifrost_model |
+----------------+
|
V
+----------------+
| bifrost_outputs_groq |
+----------------+
'''
```

The flow diagram shows the active files being passed through the Groq Bifrost model to generate the decoder outputs. The decoder outputs are then stored in the 'bifrost_outputs_groq' variable.

Below is a summary of the functionality of this code block: it runs the Bifrost decoder model on the Groq accelerator to generate the decoder outputs for each active file. The decoder outputs are then stored in the 'bifrost_outputs_groq' variable.

Unformatted Seventh Block of code

```
# import os
os.environ['PYTHONPATH']='/opt/groq/runtime/site-packages/'
# run bifrost on groq
bifrost_outputs_groq = groq_bifrost_model.run_abunch(
    [{ "input": active_files[key]["encoder_outputs_cpu"] } for key in
active_files.keys( )]
)
for key, bifrost_output_groq in zip(active_files.keys( ), bifrost_outputs_groq):
    active_files[key]["bifrost_outputs_groq"] = bifrost_output_groq
# decode text on groq
for key in active_files.keys( ):
    active_files[key]["text"] =
decoder.decode(active_files[key]["bifrost_outputs_groq"].squeeze(0).detach( ).numpy( ),
beam_width =500)
print(active_files[key]["text"])
```

Technical Description:

1. 'os.environ['PYTHONPATH']='/opt/groq/runtime/site-packages/'': This line sets the 'PYTHONPATH' environment variable to the directory containing the Groq runtime site-packages.
2. 'bifrost_outputs_groq=groq_bifrost_model.run_abunch([{"input": active_files[key]["encoder_outputs_cpu"]} for key in active_files.keys( )])': This line runs the Bifrost decoder model on the Groq accelerator to generate the decoder outputs for each active file. The input to the model is the encoder outputs for each active file, which are stored in the 'encoder_outputs_cpu' key of the 'active_files' dictionary. The output of the model is a list of decoder outputs, which are stored in the 'bifrost_outputs_groq' variable.
3. 'for key, bifrost_output_groq in zip(active_files.keys( ), bifrost_outputs_groq):': This line loops over the keys of the 'active_files' dictionary and the corresponding decoder outputs in the 'bifrost_outputs_groq' list.
4. 'active_files[key]["bifrost_outputs_groq"]=bifrost_output_groq': This line stores the decoder outputs for each active file in the 'bifrost_outputs groq' key of the 'active_files' dictionary.

5. 'for key in active_files.keys( ):': This line loops over the keys of the 'active_files' dictionary.
6. 'active_files[key]["text"]=decoder.decode(active_files[key]["bifrost_outputs_groq"].squeeze(0).detach( ).numpy( ), beam_width=500)': This line runs the decoder on the decoder outputs for each active file to generate the final decoded text. The decoder outputs are first squeezed to remove any unnecessary dimensions, then detached from the tensor to prevent memory leaks, and finally converted to a numpy array. The 'decoder.decode( )' function takes the decoder outputs and the beam width as input and returns the decoded text.
7. 'print(active_files[key]["text"])': This line prints the decoded text for each active file Interpretation.

Flow Diagram:

```
```
+----------------
| active_files |
|
|
V
+----------------+
```

-continued

```
| encoder_outputs_cpu |
+----------------+
|
|
V
+----------------+
| groq_bifrost_model |
+----------------+
|
|
V
+----------------+
| bifrost_outputs_groq |
+----------------+
|
|
V
+----------------+
| decoder |
+----------------+
|
|
V
+----------------+
```
```

-continued

```
                | decoded_text |
```
```                +----------------+
```

The flow diagram shows the active files being passed through the Bifrost decoder model to generate the decoder outputs, which are then passed through the decoder to generate the final decoded text. The decoded text is then printed to the console.

Summary:

This code block runs the Bifrost decoder model on the Groq accelerator to generate the decoder outputs for each active file, and then runs the decoder on the decoder outputs to generate the final decoded text. The decoded text is then printed to the console.

The final block defines the model and optimizer and trains the model.

A comparison of Bifrost-Speech2Text running on Groq hardware and GPUs is a natural point of interest. However, it is suspected that customers may be more interested in evaluating the performance of "Bifrost-Speech2Text running on Groq hardware" versus "Original Speech2Text running on GPUs."

In an enterprise environment, streaming and stateful transcription of audio are crucial. To simulate this setting, 20 seconds of audio are concatenated in batches, resulting in a total audio length exceeding two days. The compute performance is evaluated across three dimensions:

1. Low latency for a seamless user experience, equivalent to the transcription delay; the time it takes for text to appear as you speak.
2. High throughput, as enterprise systems must support hundreds of millions of queries per second. A denial-of-service (DOS) attack in an enterprise setting is particularly detrimental.

Due to the incompatibility of the Speech2Text encoder with Groq hardware (output mismatch), Bifrost is run on Groq with the Speech2Text encoder running on a GPU. Additionally, the performance of the entire Bifrost-Speech2Text model running on Groq hardware is estimated by comparing the speedup of Bifrost against the GPU and applying the same factor to the encoder.

To optimize time efficiency, the performance numbers of the models across the three device types have been preemptively logged. The code below is used to present these numbers.

DETAILED DESCRIPTION—CONCLUSION

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an ECIN comprises a particular feature, structure, function, or characteristic, it is within the knowledge and understanding of a skilled person to use such feature, structure, function, or characteristic in connection with another ECIN whether or not explicitly described, for example, as a substitute for another feature, structure, function, or characteristic.

In view of the Detailed Description, a skilled person will understand that many variations of any ECIN can be enabled, such as function and structure of elements, described herein while being as useful as the ECIN. One or more elements of an ECIN can be substituted for one or more elements in another ECIN, as will be understood by a skilled person. Writings about any ECIN signify its use in commerce, thereby enabling other skilled people to similarly use this ECIN in commerce.

This Detailed Description is fitly written to provide knowledge and understanding. It is neither exhaustive nor limiting of the precise structures described but is to be accorded the widest scope consistent with the disclosed principles and features. Without limitation, any and all equivalents described, signified or Incorporated by Reference (or explicitly incorporated) in this patent application are specifically incorporated into the Detailed Description. In addition, any and all variations described, signified, or incorporated with respect to any one ECIN also can be included with any other ECIN. Any such variations include both currently known variations as well as future variations, for example any element used for enablement includes a future equivalent element that provides the same function, regardless of the structure of the future equivalent element.

What is claimed is:

1. A neural network architecture for natural language processing comprising:

a machine learning model configured for processing a speech signal to generate an intermediate speech recognition output corresponding to the speech signal, the machine learning model comprising a plurality of parallel dilated convolutional components, wherein each respective dilated convolutional component of the plurality of parallel dilated convolutional components implements a filter having gaps between its values, and wherein at least one respective dilated convolutional component of the plurality of parallel dilated convolutional components has a distinct dilation parameter that is different from a plurality of dilation parameters of other dilated convolutional components of the plurality of parallel dilated convolutional components; and a decoder configured to generate an output sequence based at least in part on the intermediate speech recognition output.

2. The neural network architecture for natural language processing of claim 1, wherein the machine learning model further comprises:

a plurality of parallel attention blocks each coupled to a corresponding dilated convolutional component of the plurality of parallel dilated convolutional components.

3. The neural network architecture for natural language processing of claim 2, wherein the at least one respective dilated convolutional component comprises:

a 1D convolution neural network (CNN) configured to process 1dimensional data.

4. The neural network architecture for natural language processing of claim 2, wherein at least one attention block of the plurality of parallel attention blocks comprises a multi-headed self-attention block.

5. The neural network architecture for natural language processing of claim 1, wherein the intermediate speech recognition output comprises a context vector, and wherein the decoder uses the context vector and a hidden state indicative of one or more outputs previously generated by the decoder to produce a probability distribution over a vocabulary for a next output in the output sequence.

6. The neural network architecture for natural language processing of claim 1, further comprising a compiled binary comprising deterministic scheduling information specifying when one or more instructions will be executed.

7. The neural network architecture for natural language processing of claim 1, wherein the decoder comprises at least one feedforward layer.

8. A non-transitory computer readable storage medium that stores computer program instructions, the computer program instructions, when executed by a computer processor, cause the computer processor to:

provide an input speech signal to a machine learning model configured for processing the input speech signal to generate an intermediate speech recognition output corresponding to the input speech signal, the machine learning model comprising a plurality of parallel dilated convolutional components, wherein each respective dilated convolutional component of the plurality of parallel dilated convolutional components implements a filter having gaps between its values, and wherein at least one respective dilated convolutional component of the plurality of parallel dilated convolutional components has a distinct dilation parameter that is different from a plurality of dilation parameters of other dilated convolutional components of the plurality of parallel dilated convolutional components; and provide the intermediate speech recognition output to a decoder configured to generate an output sequence based at least in part on the intermediate speech recognition output.

9. The neural network architecture for natural language processing of claim 1, wherein the plurality of dilation parameters of the other dilated convolutional components comprises at least four additional dilation parameters that are different from each other and different from the distinct dilation parameter.

10. The neural network architecture for natural language processing of claim 1, further comprising a feature extractor configured to receive input audio data and output a sequence of feature maps.

11. The neural network architecture for natural language processing of claim 1, further comprising a phoneme tokenizer configured to map input audio data to a sequence of phonemes based on their acoustic properties.

12. The neural network architecture for natural language processing of claim 1, wherein the decoder comprises a connectionist temporal classification (CTC) decoder.

13. The non-transitory computer readable storage medium of claim 8, wherein the machine learning model further comprises a plurality of parallel attention blocks each coupled to a corresponding dilated convolutional component of the plurality of parallel dilated convolutional components.

14. The non-transitory computer readable storage medium of claim 13, wherein at least one attention block of the plurality of parallel attention blocks comprises a multi-headed self-attention block.

15. The non-transitory computer readable storage medium of claim 8, wherein the at least one respective dilated convolutional component comprises a 1D convolution neural network (CNN) configured to process 1-dimensional data.

16. The non-transitory computer readable storage medium of claim 8, wherein the intermediate speech recognition output comprises a context vector, and wherein the decoder uses the context vector and a hidden state indicative of one or more outputs previously generated by the decoder to produce a probability distribution over a vocabulary for a next output in the output sequence.

17. The non-transitory computer readable storage medium of claim 8, wherein the computer program instructions comprise a compiled binary comprising deterministic scheduling information specifying when at least one instruction of the computer program instructions will be executed.

18. The non-transitory computer readable storage medium of claim 8, wherein the decoder comprises at least one feedforward layer.

19. The non-transitory computer readable storage medium of claim 8, wherein the decoder comprises a connectionist temporal classification (CTC) decoder.

20. A computing system comprising one or more processors and one or more non-transitory computer readable storage media that store instructions that, when executed by the one or more processors, cause the one or more processors to:

provide an input speech signal to a machine learning model configured for processing the input speech signal to generate an intermediate speech recognition output corresponding to the input speech signal, the machine learning model comprising a plurality of parallel dilated convolutional components, wherein each respective dilated convolutional component of the plurality of parallel dilated convolutional components implements a filter having gaps between its values, and wherein at least one respective dilated convolutional component of the plurality of parallel dilated convolutional components has a distinct dilation parameter that is different from a plurality of dilation parameters of other dilated convolutional components of the plurality of parallel dilated convolutional components; and provide the intermediate speech recognition output to a decoder configured to generate an output sequence based at least in part on the intermediate speech recognition output.

* * * * *